United States Patent
Yasuda et al.

(10) Patent No.: US 12,538,025 B2
(45) Date of Patent: Jan. 27, 2026

(54) MOTION BLUR CORRECTION CONTROL APPARATUS AND METHOD, AND IMAGE CAPTURE APPARATUS

(71) Applicant: CANON KABUSHIKI KAISHA, Tokyo (JP)

(72) Inventors: Ryuichiro Yasuda, Tokyo (JP); Yu Narita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 18/762,458

(22) Filed: Jul. 2, 2024

(65) Prior Publication Data
US 2025/0016445 A1    Jan. 9, 2025

(30) Foreign Application Priority Data
Jul. 6, 2023   (JP) .................................. 2023-111582

(51) Int. Cl.
*H04N 23/68*    (2023.01)

(52) U.S. Cl.
CPC ....... *H04N 23/683* (2023.01); *H04N 23/6811* (2023.01); *H04N 23/687* (2023.01)

(58) Field of Classification Search
CPC ............. H04N 23/6811; H04N 23/683; H04N 23/687; H04N 23/68
USPC .................................................... 348/208.1
See application file for complete search history.

(56) References Cited

U.S. PATENT DOCUMENTS

| | | | | |
|---|---|---|---|---|
| 11,431,904 | B2* | 8/2022 | Hirama | G06T 5/73 |
| 11,575,834 | B2* | 2/2023 | Narita | H04N 23/683 |
| 11,956,539 | B2* | 4/2024 | Yasuda | H04N 23/6812 |
| 12,026,856 | B2* | 7/2024 | Narita | G06F 18/23213 |
| 2020/0374458 | A1* | 11/2020 | Sato | H04N 23/6812 |
| 2021/0185231 | A1* | 6/2021 | Narita | H04N 23/64 |
| 2022/0070377 | A1* | 3/2022 | Hirama | H04N 23/6812 |
| 2022/0417434 | A1* | 12/2022 | Yasuda | H04N 23/683 |
| 2023/0136616 | A1* | 5/2023 | Narita | G06V 10/25 348/207.99 |
| 2024/0320803 | A1* | 9/2024 | McIntosh | G06T 5/73 |

FOREIGN PATENT DOCUMENTS

JP        6727791 B2    7/2020

* cited by examiner

*Primary Examiner* — Pritham D Prabhakher
(74) *Attorney, Agent, or Firm* — Canon U.S.A., Inc. IP Division

(57) ABSTRACT

A control apparatus that obtains a correction amount for correcting a motion blur attributed to a motion of an object is disclosed. The apparatus computes a first motion blur amount based on a position of an object region in a captured image and a second motion blur amount based on an object vector indicating a motion of an object between captured images. The apparatus obtains a motion blur correction amount by adding the first motion blur amount and the second motion blur amount with use of weights corresponding to relative reliabilities of the first motion blur amount and the second motion blur amount.

20 Claims, 16 Drawing Sheets

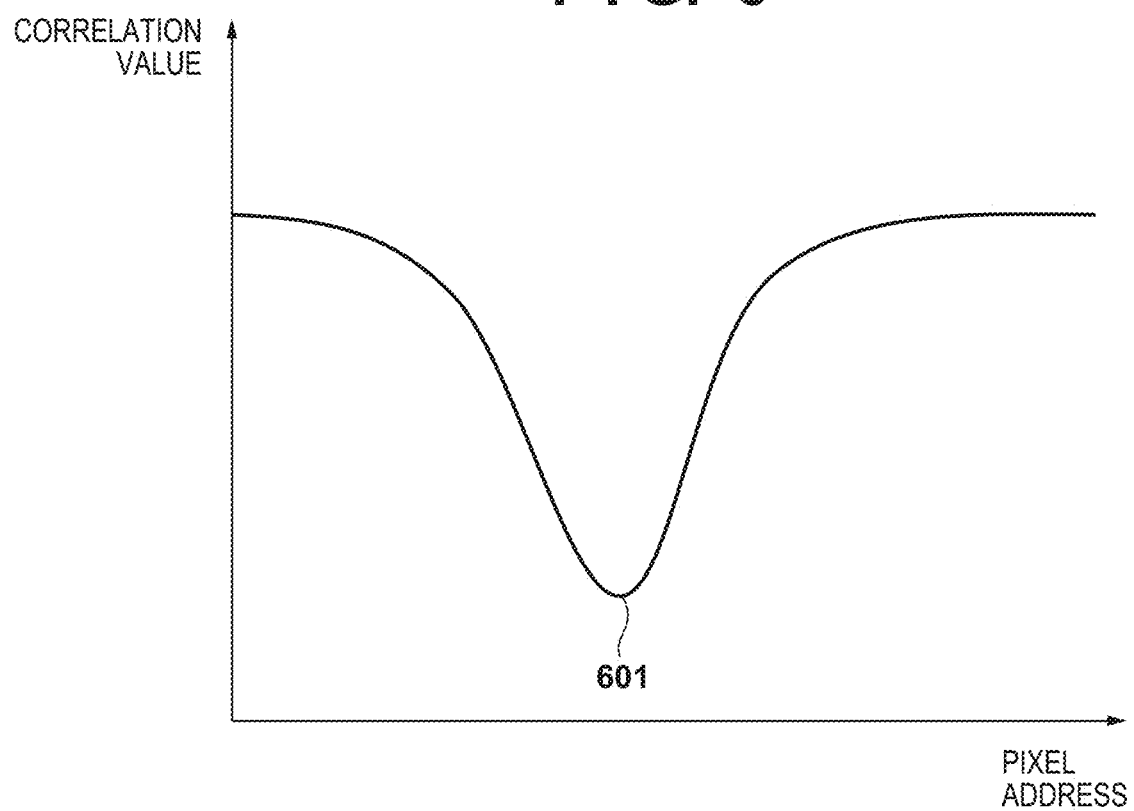

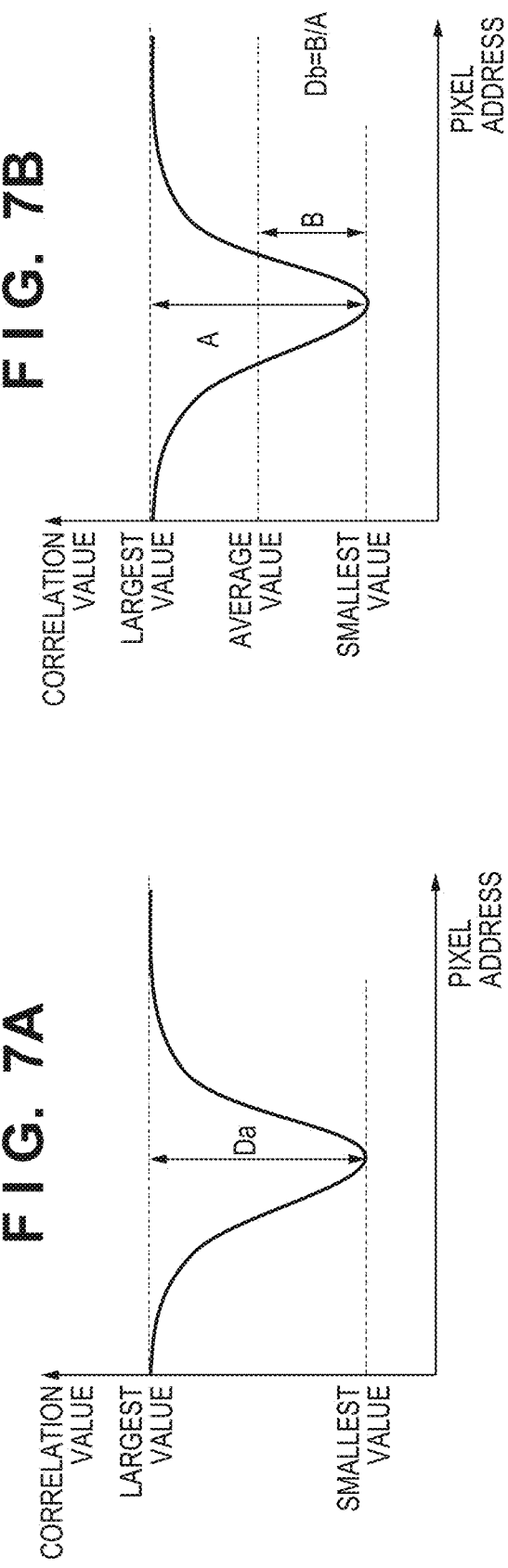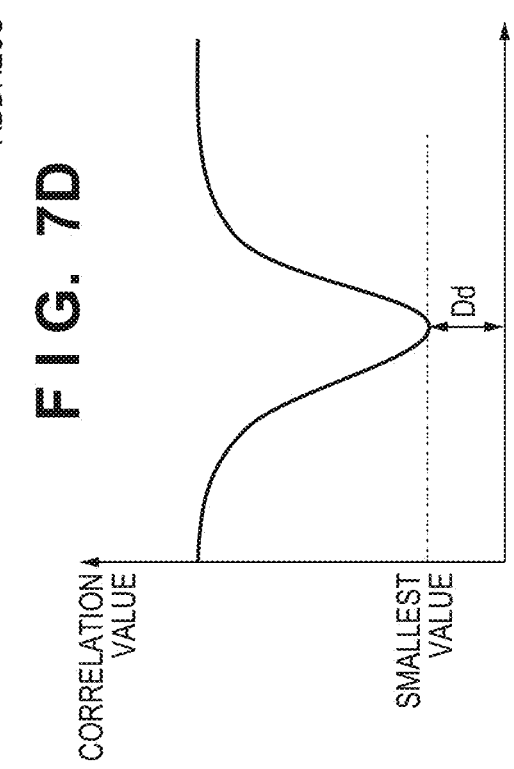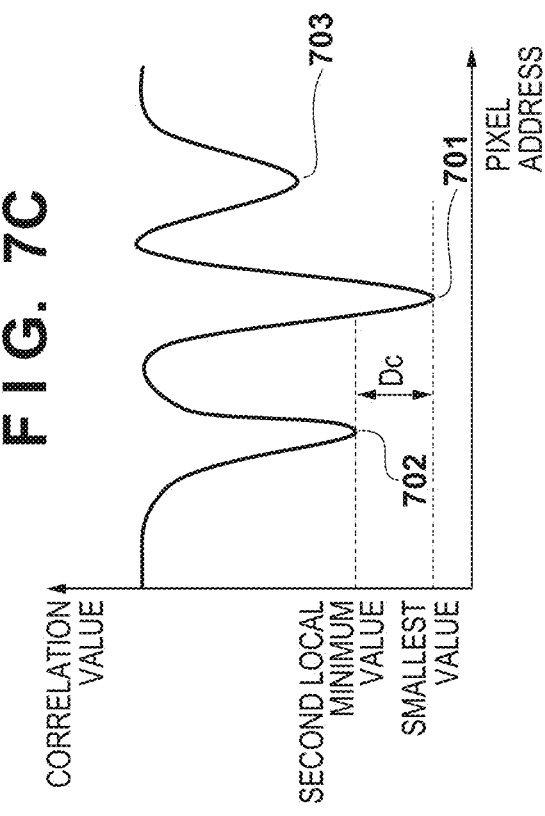

| | RELIABILITY OF FIRST MOTION BLUR AMOUNT (DETECTED POSITION OF OBJECT) | RELIABILITY OF SECOND MOTION BLUR AMOUNT (OBJECT VECTOR) |
|---|---|---|
| DEFORMABLE OBJECT | HIGH | LOW |
| RELIABILITY OF OBJECT DETECTION IS LOW | LOW | HIGH |
| RELIABILITY OF OBJECT VECTOR IS LOW | HIGH | LOW |

MOTION BLUR CORRECTION CONTROL APPARATUS AND METHOD, AND IMAGE CAPTURE APPARATUS

BACKGROUND

Technical Field

The aspect of the embodiments relates to a motion blur correction control apparatus and method, and an image capture apparatus.

Description of the Related Art

Image capture apparatuses such as digital cameras have known functions of correcting an image blur (camera shake) attributed to a motion of a camera, and correcting a motion blur attributed to a movement of an object during exposure.

A camera shake can be estimated by detecting a motion of an image capture apparatus, whereas a motion blur can be estimated by detecting a motion of an object. The motion blur can be corrected (reduced) by moving an image capture range so as to track the estimated motion of the object (Japanese Patent No. 6727791).

The motion of the object can be detected using various methods. However, as each detection method has advantages and disadvantages, it is difficult to detect the motion of the object with high accuracy using one detection method.

SUMMARY

According to an aspect of the embodiments, there is provided a control apparatus that obtains a correction amount for correcting a motion blur attributed to a motion of an object, the control apparatus comprising, one or more processors that execute a program stored in a memory and thereby function as: a first computation unit configured to compute a first motion blur amount based on a position of an object region in a captured image; a second computation unit configured to compute a second motion blur amount based on an object vector indicating a motion of an object between captured images; and a correction amount computation unit configured to obtain a motion blur correction amount by adding the first motion blur amount and the second motion blur amount with use of weights corresponding to relative reliabilities of the first motion blur amount and the second motion blur amount.

According to another aspect of the embodiments, there is provided an image capture apparatus, comprising: a control apparatus; and one or more processors that execute a program stored in a memory and thereby function as a blur correction control unit configured to execute optical or electronic blur correction with use of the amount, wherein the control apparatus obtains a correction amount for correcting a motion blur attributed to a motion of an object, the control apparatus comprising, one or more processors that execute a program stored in a memory and thereby function as: a first computation unit configured to compute a first motion blur amount based on a position of an object region in a captured image; a second computation unit configured to compute a second motion blur amount based on an object vector indicating a motion of an object between captured images; and a correction amount computation unit configured to obtain a motion blur correction amount by adding the first motion blur amount and the second motion blur amount with use of weights corresponding to relative reliabilities of the first motion blur amount and the second motion blur amount.

According to a further aspect of the embodiments, there is provided a control method for obtaining a correction amount for correcting a motion blur attributed to a motion of an object, the control method being executed by a control apparatus and comprising: computing a first motion blur amount based on a position of an object region in a captured image; computing a second motion blur amount based on an object vector indicating a motion of an object between captured images; and obtaining a motion blur correction amount by adding the first motion blur amount and the second motion blur amount with use of weights corresponding to relative reliabilities of the first motion blur amount and the second motion blur amount.

According to another aspect of the embodiments, there is provided a non-transitory computer-readable medium storing a computer program having instructions executable by a computer that, when executed by a computer, causes the computer to perform a control method for obtaining a correction amount for correcting a motion blur attributed to a motion of an object, the method comprising: computing a first motion blur amount based on a position of an object region in a captured image; computing a second motion blur amount based on an object vector indicating a motion of an object between captured images; and obtaining a motion blur correction amount by adding the first motion blur amount and the second motion blur amount with use of weights corresponding to relative reliabilities of the first motion blur amount and the second motion blur amount.

Further features of the disclosure will become apparent from the following description of exemplary embodiments (with reference to the attached drawings).

BRIEF DESCRIPTION OF THE DRAWINGS

FIG. 6 is a diagram showing another example of representation of a correlation value map according to embodiments.

FIG. 7A to FIG. 7D are diagrams showing examples of indexes of a reliability of a motion vector that can be used in embodiments.

DESCRIPTION OF THE EMBODIMENTS

Below, embodiments will be described in detail with reference to the attached drawings. Note that the following embodiments do not limit the claims. Although the embodiments describe a plurality of features, not all of these plurality of features are necessarily indispensable, and the plurality of features may be combined in any manner. Furthermore, the same or similar constituents are given the same reference numbers in the attached drawings, and overlapping descriptions are omitted.

Note that the following description is related to a case where a part of the embodiments of the disclosure is implemented on a digital camera. However, the embodiments of the disclosure can also be implemented on any electronic devices with an image capture function. Such electronic devices include a video camera, a computer device (a personal computer, a tablet computer, a media player, a PDA, or the like), a mobile telephone device, a smartphone, a game device, a robot, a drone, and a driving recorder. These are examples; the embodiments can also be implemented on other electronic devices.

First Embodiment

Figure 1:
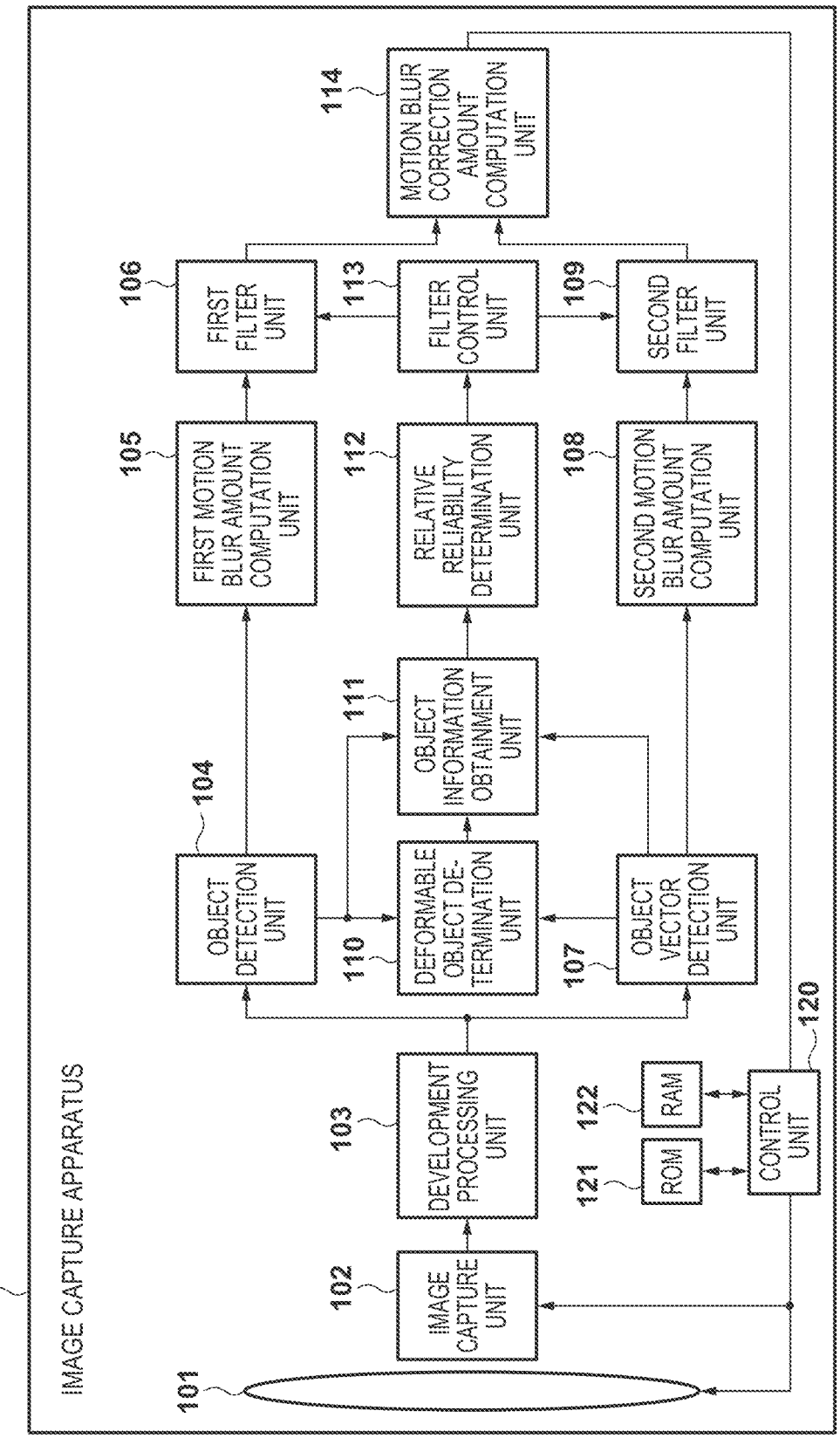
FIG. 1 is a block diagram showing an exemplary functional configuration of an image capture apparatus that includes a motion blur correction control apparatus according to a first embodiment.

FIG. 1 is a block diagram showing an exemplary functional configuration of an image capture apparatus 100 that includes a motion blur correction control apparatus according to a first embodiment. Note that in FIG. 1, among the constituent elements included in the image capture apparatus 100, the constituent elements related to motion blur correction are shown as functional blocks.

Each functional block shown in FIG. 1 may be realized by one of software, hardware, and a combination thereof, except for the components that can be realized only by hardware, such as lenses and an image sensor. For example, the functional blocks may be realized by dedicated hardware such as an ASIC. Also, the functional blocks may be realized by a processor included in a control unit 120, which controls the operations of the image capture apparatus 100, executing a program that has been stored in a nonvolatile memory (ROM 121) in advance.

A plurality of functional blocks may be realized by the same constituent (e.g., one ASIC). Furthermore, hardware that realizes a part of the functions of a certain functional block may be included in hardware that realizes another functional block. For example, a development processing unit 103, an object detection unit 104, and an object vector detection unit 107 may be realized as functions of an image processing circuit.

In FIG. 1, functional blocks 104 to 114 provided in a stage following the development processing unit 103 compose the motion blur correction control apparatus. The motion blur correction control apparatus computes a correction amount for each of the horizontal (X) direction and the vertical (Y) direction in an image. The motion blur correction amounts are used to (correct and) reduce a blur of an object image attributed to a movement of an object during an exposure period of the image sensor.

The optical system 101 includes a plurality of lenses, and forms an optical image of the object on an image capture plane of the image sensor. The plurality of lenses includes movable lenses, and the movable lenses include a focus lens and a blur correction lens. The focus lens is movable in the optical axis direction, and the blur correction lens is movable in the directions perpendicular to the optical axis (the X direction and the Y direction). The blur correction lens is used in motion blur correction and camera shake correction. The optical system 101 includes driving mechanisms (motors, actuators, and the like) for the movable lenses. The operations of the driving mechanisms are controlled by the control unit 120. The optical system 101 can include other constituents such as a diaphragm and a shutter.

An image capture unit 102 includes the image sensor and a driving circuit therefor. The image sensor may be a known CCD or CMOS color image sensor that includes, for example, color filters based on the primary-color Bayer arrangement. The image sensor includes a pixel array in which a plurality of pixels is arrayed two-dimensionally, and a peripheral circuit for reading out a signal from each pixel. In the present embodiment, the image sensor is movable in the horizontal direction and the vertical direction on a plane perpendicular to the optical axis. Each pixel accumulates charges corresponding to the amount of incident light by way of photoelectric conversion.

A signal having a voltage corresponding to the amount of charges accumulated in the exposure period is read out from each pixel via the peripheral circuit; as a result, a pixel signal group (analog image signals) representing an object image formed on the image capture plane is obtained. It is assumed here that the image capture unit 102 generates digital image signals (image data) by applying noise reduction processing and A/D conversion processing to the analog image signals. The image capture unit 102 outputs the image data to the development processing unit 103.

The control unit 120 is, for example, a processor (a CPU, an MPU, a microprocessor, or the like) capable of executing the program. The control unit 120 controls the operations of the image capture apparatus 100, including the motion blur correction control apparatus, by reading the program stored in the ROM 121 into a RAM 122 and executing the program. The control unit 120 is connected to each functional block, which is omitted in FIG. 1. The operations related to automatic focus detection (AF) and automatic exposure control (AE) are also executed by the control unit 120.

The ROM 121 is a rewritable nonvolatile memory, and stores the program executed by the control unit 120, various types of setting values of the image capture apparatus 100, graphical user interface (GUI) data, and the like. The RAM 122 is a main memory that is used when the control unit 120 executes the program. The RAM 122 can also be used to store image data output from the image capture unit 102, and used by the development processing unit 103 to store intermediate data and processed data.

The development processing unit 103 applies predetermined image processing such as color interpolation processing, white balance processing, tone correction processing, and RGB-YUV conversion processing to image data output from the image capture unit 102, thereby generating image data to be used for display and recording. The color interpolation processing is processing for generating the values of color components that are not included in individual pieces of pixel data that compose the image data, and is also referred to as demosaicing processing. Note that the development processing unit 103 may apply other types of processing such as correction of image deterioration attributed to optical aberration of the optical system 101, correction of the influence of vignetting in the optical system 101, and color correction. The image data generated by the development processing unit 103 is output to the object detection unit 104 and the object vector detection unit 107. Note that the development processing unit 103 may store the image data into the RAM 122, and the object detection unit 104 and the object vector detection unit 107 may read out the image data from the RAM 122.

It is assumed that the operations of each functional block composing the motion blur correction control apparatus, which will be described below, are executed with respect to image data that is output from the development processing unit 103 at a predetermined frame rate during shooting of moving images. Note that processing related to the computation of the motion blur correction amounts may not be executed on a per-frame basis, or may not be completed within a period of one frame.

The object detection unit 104 applies object detection processing to data of a captured image corresponding to one frame output from the development processing unit 103. The object detection processing is processing for detecting a region (an object region) that shows an object of a predetermined type, and outputting a detection result. The detection result may be information corresponding to each detected object region (e.g., the type of the object, and the position, size, and detection reliability of the object region). The position may be, for example, barycentric coordinates (x, y) of the object region that are expressed based on an image coordinate system. The size may be, for example, the number of pixels included in the object region, or the area of the smallest rectangular region in which the object region is inscribed (pixel-based). The position and the size may be in other forms.

It is assumed here that the object detection unit 104 applies object detection processing that uses a machine learning model (trained model) that has been trained in advance to detect an object region of an object of a specific type from input two-dimensional image data. The trained model may use, for example, a convolutional neural network (CNN). The object detection unit 104 may detect object regions of a plurality of types of objects using a plurality of trained models. The trained model may be installed on the object detection unit 104 in advance. Furthermore, the type of the object to be detected may be automatically determined in accordance with a setting (e.g., a shooting mode) of the image capture apparatus 100, or may be able to be designated by a user.

For each object region, the object detection unit 104 outputs the position of the object region to a first motion blur amount computation unit 105, the type of the object to a deformable object determination unit 110, and the type of the object and the detection reliability to an object information obtainment unit 111.

The first motion blur amount computation unit 105 computes the difference between the detected position obtained from the object detection unit 104 and a target position of the object, which has been set in advance as image coordinates, as a first motion blur amount for each of an X-direction component and a Y-direction component. The first motion blur amount computation unit 105 outputs the first motion blur amounts to a first filter unit 106.

The first filter unit 106 is a high-cut filter (low-pass filter). The cutoff frequency is set by a filter control unit 113, which will be described later. The first motion blur amounts are easily influenced by high-frequency noise, but are not subject to integration drift, because the detected position of the object is used without performing integration. Therefore, low-frequency components are extracted by applying the low-pass filter to the first motion blur amounts, and used in the computation of the motion blur correction amounts. As described above, in the present embodiment, low-frequency components of the motion blur amounts that are not based on integrated values are used in the computation of the motion blur correction amounts.

The first filter unit 106 applies known low-pass filter processing to, for example, time-series data pieces of the first motion blur amounts obtained from the first motion blur amount computation unit 105 for each direction component. The first filter unit 106 outputs the low-frequency components of the first motion blur amounts obtained through the low-pass filter processing to a motion blur correction amount computation unit 114.

The object vector detection unit 107 detects a vector (an object vector) indicating a motion of the object between frames (between captured images) and the reliability thereof from image data corresponding to two frames output from the development processing unit 103. The object vector can be detected using any known method. For example, a moving region (an object region) and a stationary region (a background region) can be separated from each other based on the difference between the frames, and a vector indicating the moving amount and the moving direction of the moving region can be detected as an object vector. Note that the detection accuracy of the object vector may be increased by excluding the motion of the image capture apparatus that has been detected for camera shake correction.

(Method of Detecting Object Vector)

Figure 3B:
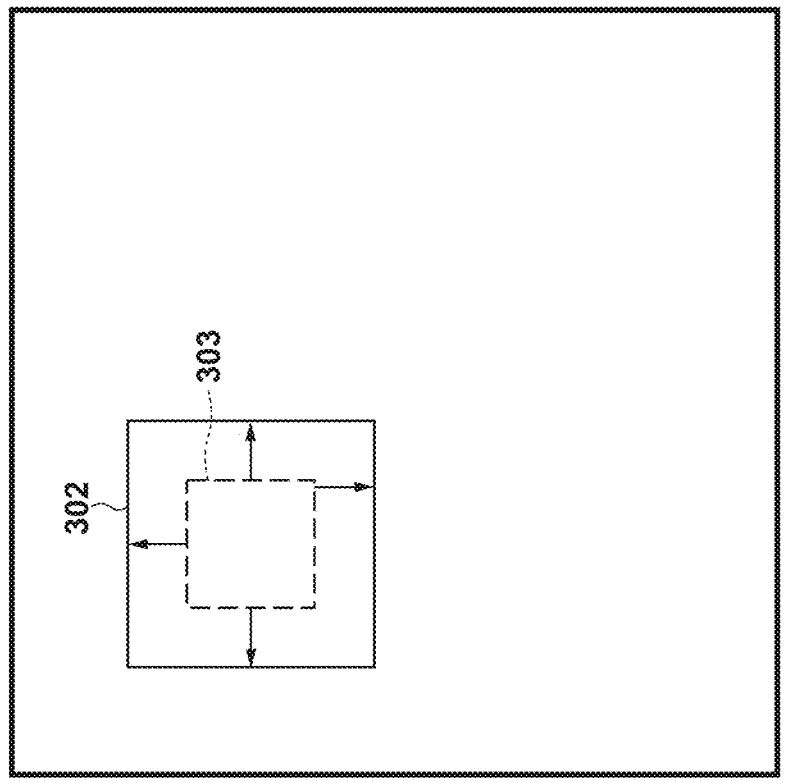
FIG. 3A and FIG. 3B are schematic diagrams of template matching that can be executed in embodiments.
Figure 3A:
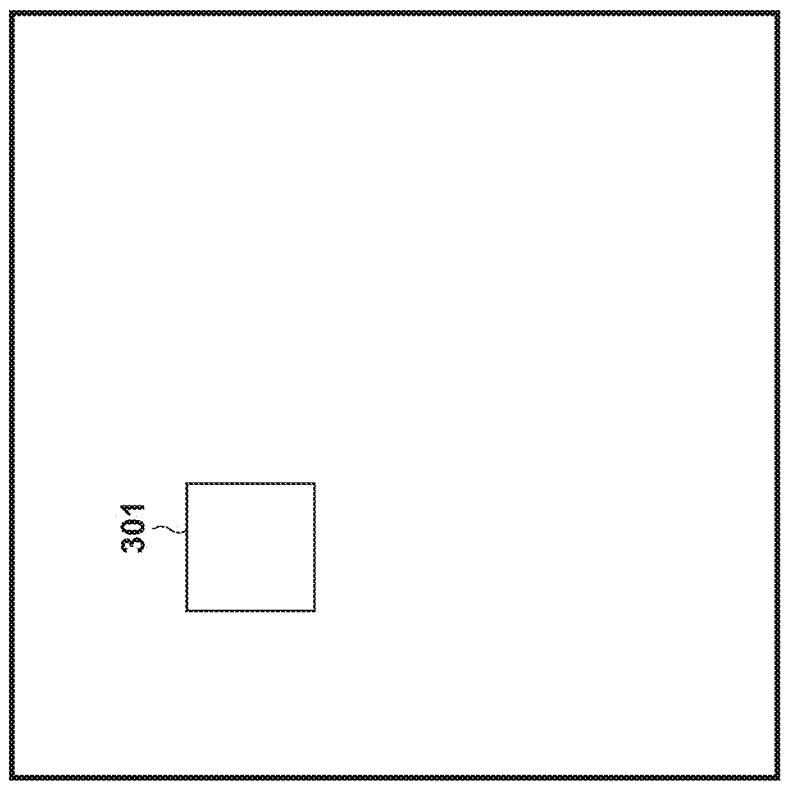

A description is now given of a method of detecting an object vector with use of template matching, as one example of a method of detecting an object vector that can be implemented by the object vector detection unit 107. FIG. 3A schematically shows an image of an earlier shooting timing (a base image) among the images of the two frames used in the detection, whereas FIG. 3B schematically shows an image of a later shooting timing (a reference image) thereamong.

The object vector detection unit 107 sets a template region 301 and a search region 302 in the base image and the reference image, respectively. The object vector detection unit 107 searches for a region that has the highest correlation with an image of the template region 301 inside the search region 302.

The template region 301 may be, for example, a square region of a predetermined size. The object vector detection unit 107 may set the template region 301 so that it is centered at predetermined coordinates, or so that it is centered at coordinates of a characteristic point inside the image that is detected using a known method. Furthermore, the object vector detection unit 107 may determine the central coordinates of template regions 301 so as to set the same number of template regions 301 both inside the object region and outside the object region based on the position of the object region detected by the object detection unit 104. The object vector detection unit 107 can set, as the search region, a region which has the same central coordinates as the template region 301 and which is obtained by uniformly enlarging the size of the template region 301 in the up, down, left, and right directions in the reference image, for example.

In the present embodiment, a sum of absolute differences (SAD) in the luminance values of pixels at corresponding positions is computed as a correlation value S-SAD. A computation formula for the SAD is shown in formula (1).

$$S\_SAD = \sum_i \sum_j |f(i, j) - g(i, j)| \quad (1)$$

In formula (1), f (i, j) denotes a luminance value of a pixel at coordinates (i, j) inside the template region 301. Also, g (i, j) denotes a luminance value of a pixel at coordinates (i, j) inside a region (correlation value computation region) 303 in which the correlation value is computed within the search region 302. The smaller the value of the correlation value S_SAD, the higher the degree of similarity (correlation) between the textures of the template region 301 and the correlation value computation region 303.

The object vector detection unit 107 may compute a value other than the SAD, such as a sum of squared differences (SSD), a normalized cross-correlation (NCC), and the like as the correlation value.

The object vector detection unit 107 moves the position of the correlation value computation region 303 in the horizontal direction and the horizontal direction, for example, on a per-pixel basis within the search region 302, and computes a correlation value at each position. The object vector detection unit 107 generates a correlation value map for the search region 302 using the computed correlation values.

Figure 4A:
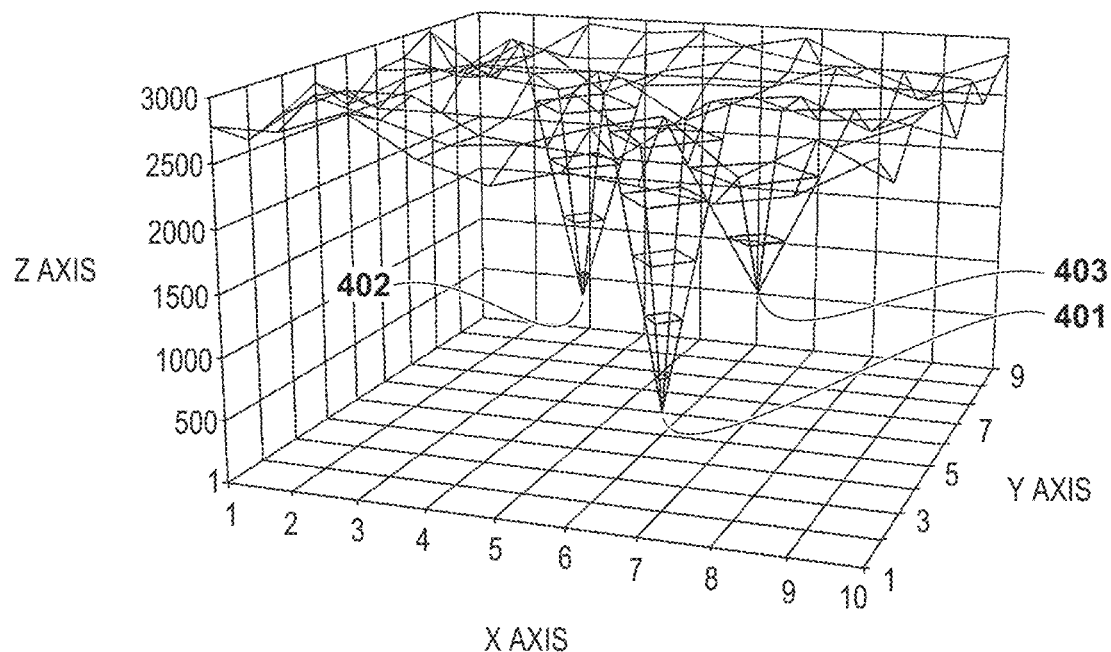
FIG. 4A and FIG. 4B are diagrams showing examples of a correlation value map that can be generated in embodiments.

FIG. 4A shows an example of the correlation value map computed in the coordinate system of the search region 302; the X-axis and the Y-axis indicate the coordinates of the correlation value map, and the Z-axis indicates the magnitudes of the correlation values computed for the correlation value computation region 303 that has been set at coordinates (X, Y). Also, FIG. 4B is a two-dimensional correlation value map representing FIG. 4A as viewed from the Z-axis direction, and shows coordinates with predetermined correlation values connected by lines.

Figure 4B:
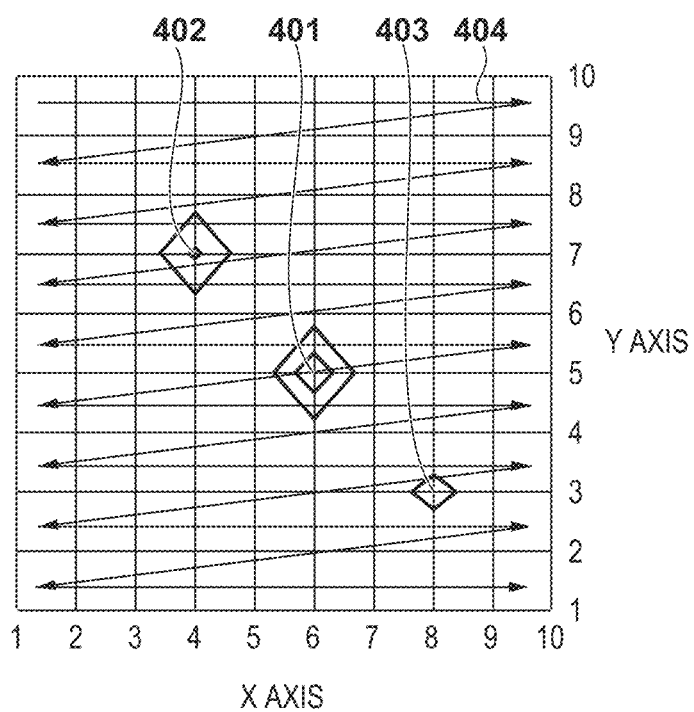

In FIG. 4A and FIG. 4B, the correlation value computation region 303 for which the smallest correlation value 401 has been computed has the texture that is most similar to the texture of the template region 301. Furthermore, the correlation value computation regions 303 corresponding to the second smallest correlation value 402 and the third smallest correlation value 403 also have the textures similar to the texture of the template region 301.

In this way, the object vector detection unit 107 searches for a region that has the smallest correlation value in relation to the template region 301 inside the search region 302, and specifies the region that has been searched for as a moving destination of the template region 301. Then, the object vector detection unit 107 detects, as a motion vector, a vector starting at the central coordinates of the template region 301 and ends at the central coordinates of the region specified as the moving destination in the image coordinate system.

A description is now given of an example of a method of separating motion vectors that have been detected for the respective template regions 301 set in the base image into background vectors and object vectors. Based on the position of the object region detected by the object detection unit 104, the object vector detection unit 107 considers motion vectors starting at coordinates inside the object region as object vectors, and motion vectors starting at coordinates outside the object region as background vector (first separation processing).

Note that in a case where an object has not been detected, the first separation processing may be executed using depth information (distance information) obtained through a known method based on the captured image. For example, a motion vector can be considered as a background vector when the object distance corresponding to the image coordinates of the start point thereof is equal to or larger than a first threshold, and a motion vector can be considered as an object vector when the object distance corresponding to the image coordinates of the start point thereof is smaller than a second threshold. Here, the first threshold≥the second threshold.

The separation between background vectors and object vectors may be completed in the first separation processing. However, in the above-described separation processing based on the detected object region, a motion vector starting at coordinates near a boundary between a background and an object may be classified erroneously. Furthermore, in a case where the accuracy of object detection is low, the accuracy of the separation processing becomes low as well.

In view of this, the accuracy of the separation processing can be increased by further executing second separation processing that is not dependent on the object region. For example, second separation processing based on the known k-means method can be executed as one example of separation processing based on the amounts of motion vectors.

According to the k-means method, the number k of classified clusters and an initial value Vk of the mass center of each cluster are determined in advance.

For classification into a background cluster and an object cluster, 2 is set as the number k of clusters. In a case where a plurality of objects exists, the number of clusters may be changed in accordance with the number of objects. Furthermore, a cluster for classifying a group of motion vectors that belong to neither the background nor the object may be provided.

The initial value Vk of the mass center of each cluster can be set using the result of the first separation processing. With respect to motion vectors that have been classified as background vectors in the first separation processing, the object vector detection unit 107 generates a histogram of moving amounts in the X direction and a histogram of moving amounts in the Y direction. As modes V1x and V1y of the respective histograms are representative values of the background vectors, the object vector detection unit 107 sets (V1x, V1y) as the initial value V1 of the mass center of the background cluster. Similarly, the object vector detection unit 107 obtains representative values V2x and V2y of motion vectors that have been classified as object vectors in the first separation processing, and sets (V2x, V2y) as the initial value V2 of the mass center of the object cluster.

Note that the initial value V1 of the mass center of the background cluster may be set using the motion of the image capture apparatus 100 that has been detected for camera shake correction. For example, in a case where the motion of the image capture apparatus 100 is detected using an angular velocity sensor, the object vector detection unit 107 converts the angular velocities in the yaw direction and the pitch direction respectively into angles θy and θp by integrating them, and further converts the angles θy and θp into the displacement amounts V1x and V1y on the image capture plane. Provided that the focal length of the optical system 101 is f [mm], the displacement amounts V1x and V1y can be computed as V1x=f tan (θy) and V1y=f tan (θp).

Also, the initial value V2 of the mass center of the object cluster may be set by obtaining a representative value of the displacement amounts of the detected positions of the object region that are obtained in time series by the object detection unit 104 in a manner similar to the representative value of the object vectors.

Once the number of clusters and the initial value of the mass center of each cluster have been set in the foregoing manner, the object vector detection unit 107 computes, for each motion vector, the distances between the coordinates (the moving amount in the X direction, the moving amount in the Y direction) and the mass centers of the respective clusters. Then, the object vector detection unit 107 classifies the motion vector into a cluster for which the shortest distance has been computed.

In a case where all of the motion vectors have not changed in terms of the clusters into which they are classified, or in a case where the percentage of motion vectors that have changed in terms of classification falls below a certain threshold that has been set in advance, the object vector detection unit 107 considers that the classification processing has concluded, and ends the second separation processing. In a case where it has not been determined that the classification processing has concluded, the object vector detection unit 107 re-computes the mass center on a per-cluster basis based on the classification result, and repeatedly executes the above-described computation of distances and classification.

Figure 5A:
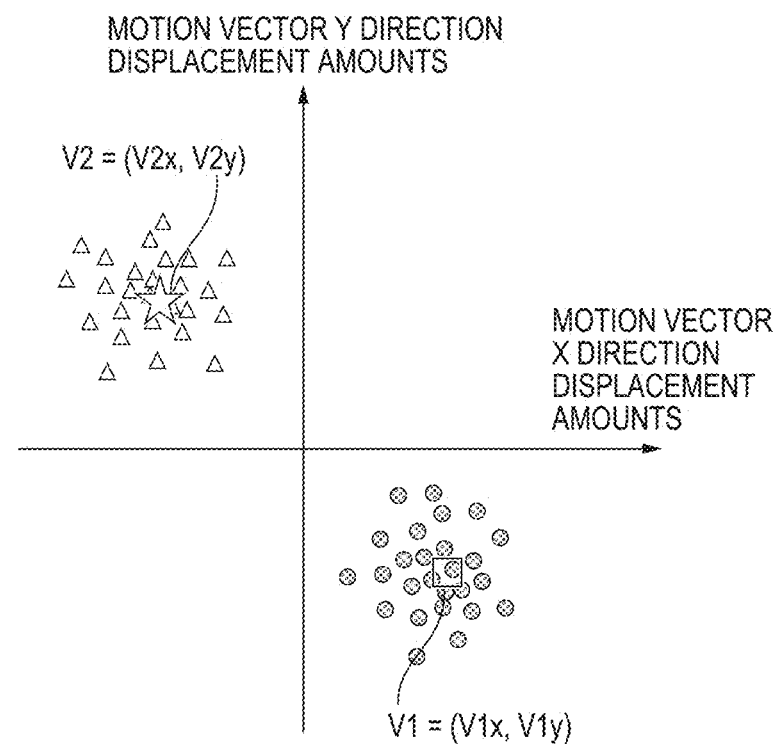
FIG. 5A and FIG. 5B are diagrams related to vector separation according to embodiments.
Figure 5B:
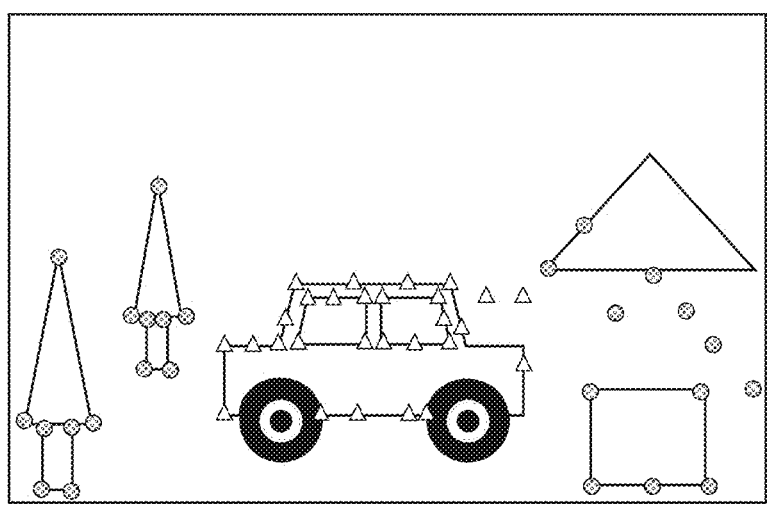

FIG. 5A and FIG. 5B show an example of the result of the second classification processing. FIG. 5A is a diagram showing a classification result where the displacement amounts of the motion vectors in the X direction have been plotted along the horizontal axis, and the displacement amounts of the motion vectors in the Y direction have been plotted along the vertical axis. A square (□) denotes the initial value V1 of the mass center of the background cluster, and a star (☆) denotes the initial value V2 of the mass center of the object cluster. The motion vectors classified as the background vectors are denoted by circles (○), and the motion vectors classified as the object vectors are denoted by triangles (△).

FIG. 5B shows a diagram in which, regarding the motion vectors corresponding to the classification result of FIG. 5A, circles (○) are plotted at the positions of the start points of the motion vectors classified as the background vectors, and triangles (△) are plotted at the positions of the start points of the motion vectors classified as the object vectors, in the base image. Assuming that a car is the object and the rest is the background, it is apparent that the classification has been performed with high accuracy.

(Method of Computing Reliability of Object Vector)

Next, one example of a method of computing the reliability of an object vector will be described. The object vector detection unit 107 computes the reliability of a motion vector using the two-dimensional correlation value map shown in FIG. 4B. FIG. 6 is a diagram showing one-dimensional data obtained by arranging the correlation values plotted in the two-dimensional correlation value map shown in FIG. 4B in the raster order indicated by arrows 404. In FIG. 6, the vertical axis indicates the correlation values, and the horizontal axis indicates pixel addresses that are uniquely defined by X coordinates and Y coordinates in the two-dimensional correlation value map. 601 corresponds to the smallest correlation value 401 shown in FIG. 4A and FIG. 4B.

FIG. 7A to FIG. 7D show examples of indexes of the reliability of a motion vector based on the correlation values. In FIG. 7A to FIG. 7D, the horizontal axis indicates pixel addresses and the vertical axis indicates correlation values, similarly to FIG. 6.

FIG. 7A shows a difference Da between the smallest value and the largest value of the correlation values as an example of the index of the reliability of a motion vector. The difference Da is equivalent to the range of the two-dimensional correlation value map; in a case where Da is small, it is expected that the contrast between textures is low, and thus it is considered that the reliability of the motion vector is also low.

FIG. 7B shows, as another example of the index of the reliability, a ratio Db (=B/A) between a difference A between the smallest value and the largest value of the correlation values and a difference B between the smallest value and the average value of the correlation values. Db indicates the steepness of the correlation value peak; in a case where Db is small, it is expected that the degree of similarity between the template region and the search region is low, and thus it is considered that the reliability of the motion vector is also low.

FIG. 7C shows a difference Dc between the smallest value of the correlation values and the second smallest value of the correlation values as still another example of the index of the reliability. 701 to 703 respectively correspond to the correlation values 401, 402, and 403 in FIG. 4A and FIG. 4B. Dc indicates the periodicity of the correlation value map; in a case where Dc is small, it is expected that the textures include repeated patterns and edges, and thus it is considered that the reliability of the motion vector is low as well. Although the smallest value and the second smallest value are used here, other local minimums may be used as long as the periodicity of the correlation value map can be determined.

FIG. 7D shows the smallest value Dd of the correlation values as still another example of the index of the reliability. In a case where Dd is large, it is expected that the degree of similarity between the template region and the search region is low, and thus it is considered that the reliability of the motion vector is also low. As Dd and the reliability are in an inverse relationship with each other, an inverse of Dd (1/Dd) is used as the index of the reliability in practice.

Note that in a case where the magnitude of the reliability is determined based on these indexes, each index can be compared with predetermined thresholds, and the reliability can be determined to be low when the index falls below a first threshold. Similarly, the reliability can be determined to be high when the index is equal to or larger than a second threshold. Here, the first threshold≤the second threshold.

Figures 8, 9:
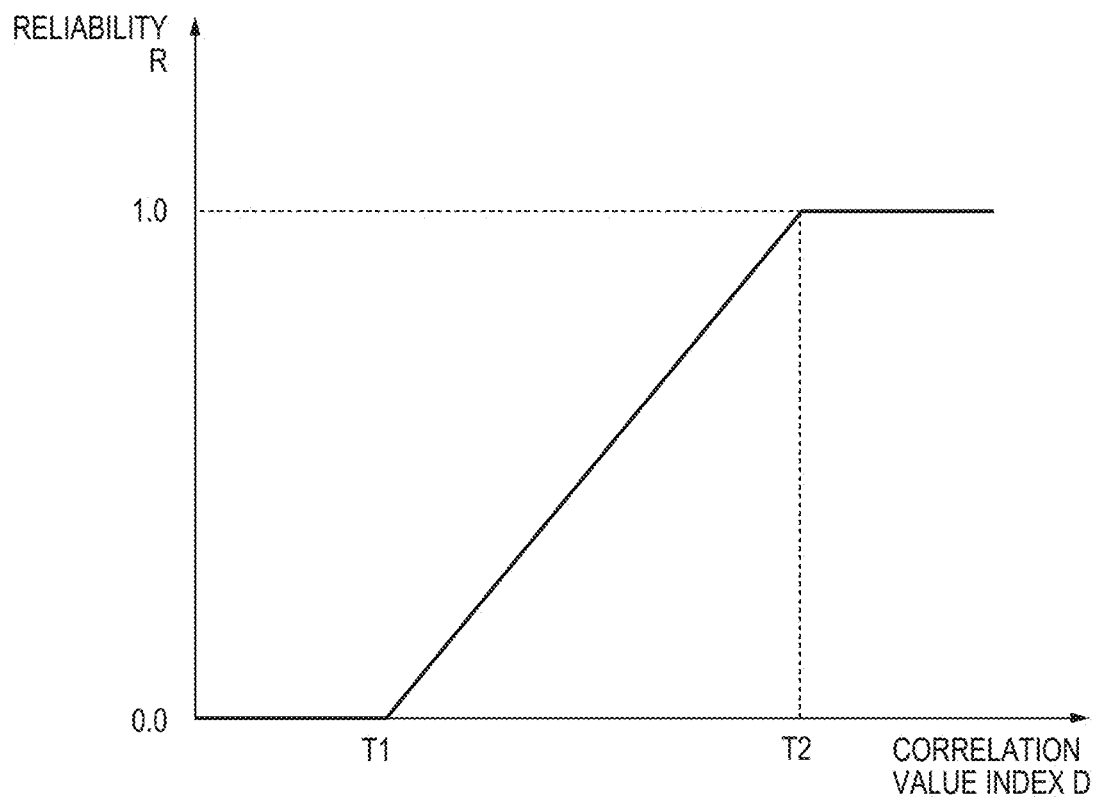
FIG. 8 is a diagram related to an example of a method of computing a reliability of a motion vector according to embodiments.
FIG. 9 is a diagram showing an example of a relationship between object information and reliabilities that can be used in embodiments.

The indexes that have been described using FIG. 7A to FIG. 7D can be used as reliabilities as is. However, the index value and the reliability may have a specific correspondence relationship with each other as shown in FIG. 8, for example. In FIG. 8, the horizontal axis indicates an index (one of the above-described Da, Db, Dc, and 1/Dd), and the vertical axis indicates the reliability. It is assumed that a reliability of 0 is the lowest, and a reliability of 1 is the highest.

In the example shown in FIG. 8, two thresholds T1 and T2 are set for the index; the reliability is 0 when the index is equal to or smaller than the threshold T1, and the reliability is 1 when the index is equal to or larger than T2. At least one of the thresholds T1 and T2 may be changed on a per-index basis. Furthermore, in a section where the index exceeds the threshold T1 but has not reached the threshold T2, the reliability increases linearly with an increase in the index. The reliability may increase non-linearly with an increase in the index. In the following description, the reliabilities that are obtained from the respective indexes described above will be referred to as Ra, Rb, Rc, and Rd. Here, the following relationships are satisfied: Ra=f(Da), Rb=f(Db), Rc=f(Dc), and Rd=f(Dd). f( ) denotes a function for converting the index into the reliability.

The object vector detection unit 107 can obtain the reliability of a motion vector based on one or more of the reliabilities Ra, Rb, Rc, and Rd. In a case where the final reliability R is obtained using a combination of two or more reliabilities, weighted addition and a logical operation can be applied.

For example, provided that the weights for the four reliabilities Ra, Rb, Rc, and Rd are Wa, Wb, Wc, and Wd, respectively, the object vector detection unit 107 can compute the final reliability R in accordance with the following formula (2).

$$R = Wa \times Ra + Wb \times Rb + Wc \times Rc + Wd \times Rd \quad (2)$$

For example, assume that the weights are as follows: Wa=0.4, Wb=0.3, Wc=0.2, and Wd=0.1. In a case where the four reliabilities Ra, Rb, Rc, and Rd are sufficiently high and Ra=Rb=Rc=Rd=1, formula (2) derives R=1.0. Also, in a case where Ra=0.6, Rb=0.5, Rc=0.7, and Rd=0.7, formula (2) derives R=0.6.

In a case where the logical operation is applied, provided that the thresholds for the reliabilities Ra, Rb, Rc, and Rd are Ta, Tb, Tc, and Td, respectively, the object vector detection unit 107 can compute the reliability R with use of logical conjunction in accordance with formula (3), for example.

$$R = (Ra \geq Ta) \wedge (Rb \geq Tb) \wedge (Rc \geq Tc) \wedge (Rd \geq Td) \quad (3)$$

∧ is a sign representing logical conjunction. In a case where all of Ra≥Ta, Rb≥Tb, Rc≥Tc, and Rd≥Td are satisfied, R=1; in other cases, R=0.

Furthermore, the final reliability R may be computed with use of logical disjunction in accordance with formula (4).

$$R = (Ra < Ta) \downarrow (Rb < Tb) \downarrow (Rc < Tc) \downarrow (Rd < Td) \quad (4)$$

↓ is a sign representing the logical NOR. In a case where none of Ra<Ta, Rb<Tb, Rc<Tc, and Rd<Td is satisfied, R=1; in other cases, R=0.

The object vector detection unit 107 outputs the detected object vector to a second motion blur amount computation unit 108 and the deformable object determination unit 110. Also, the object vector detection unit 107 outputs the reliability of the detected object vector to the object information obtainment unit 111.

The second motion blur amount computation unit 108 computes an integrated value of object vectors obtained from the object vector detection unit 107 as a second motion blur amount for each of an X-direction component and a Y-direction component. The second motion blur amount computation unit 108 can integrate a predetermined number of object vectors, or object vectors that have been detected in a predetermined period most recently. The second motion blur amount computation unit 108 outputs the second motion blur amounts to a second filter unit 109.

The second filter unit 109 is a low-cut filter (high-pass filter). The cutoff frequency is set by the filter control unit 113, which will be described later. The second motion blur amounts are not easily influenced by high-frequency noise due to the high-cut effect, but are subject to integration drift, because the object vectors are integrated. For this reason, high-frequency components are extracted by applying the high-pass filter to the second motion blur amounts, and used in the computation of the motion blur correction amounts. As described above, in the present embodiment, high-frequency components of the motion blur amounts that are based on integrated values are used in the computation of the motion blur correction amounts.

In the present embodiment, it is assumed that the cutoff frequencies of the first filter unit 106 and the second filter unit 109 are the same as one example. Therefore, control on the cutoff frequencies is equivalent to control on the relative percentages (weights) of the first motion blur amounts and the second motion blur amounts in the frequency band of the motion blur amounts. Note that the cutoff frequencies may not be completely the same.

The second filter unit 109 applies known high-pass filter processing to, for example, time-series data pieces of the second motion blur amounts obtained from the second motion blur amount computation unit 108 for each direction component. Note that the second filter unit 109 may be configured to realize the high-pass filter by subtracting data to which low-pass filter processing has been applied from data before filter processing. The second filter unit 109 outputs the high-frequency components of the second motion blur amounts obtained through the high-pass filter processing to the motion blur correction amount computation unit 114.

The deformable object determination unit 110 determines whether the detected object is a deformable object based on at least one of the type of the object obtained from the object detection unit 104 and the object vector obtained from the object vector detection unit 107. Here, a deformable object is an object whose object region can significantly change in shape in a short period of time (e.g., between frames). An animate object such as a human and an animal is a typical deformable object. Note that although an object region of an inanimate mobile object such as a vehicle and an aircraft can also successively change in shape, the possibility that this object region significantly changes in shape in a short period of time is low. Therefore, these objects are not determined to be deformable objects.

For example, out of the types of objects that are detected by the object detection unit 104, those that fall under deformable objects can be registered in advance with the deformable object determination unit 110. Then, the deformable object determination unit 110 can determine that the detected object is a deformable object if the type of the object obtained from the object detection unit 104 falls under the deformable objects that have been registered in advance.

Also, in a case where a plurality of object vectors has been detected with respect to objects of the same type in single object vector detection processing, whether the detected objects are deformable objects can be determined based on variations in the object vectors (e.g., the variance of at least one of the sizes and the directions). In a case where the variations in the object vectors related to the objects of the same type are large (equal to or larger than a threshold that has been set in advance), the deformable object determination unit 110 can determine that these objects are deformable objects.

For example, in the example shown in FIG. 5A, in a case where the variance of the motion vectors that have been classified as the object vectors (A) is larger than the threshold, the corresponding object can be determined to be a deformable object. In the case of objects that do not significantly deform between frames, such as cars and aircrafts, as most of the corresponding object vectors indicate a movement between frames, the difference in direction and size becomes small, and the variance becomes small. On the other hand, in the case of deformable objects that can significantly deform between frames, such as animals, motion vectors indicating the motions of areas of the objects, such as flapping of wings in the case of birds for example, are detected in addition to motion vectors indicating movements between frames. Therefore, the variance of the object vectors becomes large.

The deformable object determination unit 110 outputs the determination results of the respective object regions that have been detected to the object information obtainment unit 111.

The object information obtainment unit 111 obtains the type and the detection reliability of the object from the object detection unit 104, the reliability of the object vector from the object vector detection unit 107, and the determination result from the deformable object determination unit 110. These pieces of information are referred to as object information. The object information obtainment unit 111 outputs the obtained object information to a relative reliability determination unit 112.

Based on the object information obtained from the object information obtainment unit 111, the relative reliability determination unit 112 determines the relative reliabilities of the detected position of the object and the object vector. These relative reliabilities are also relative reliabilities of the first motion blur amounts computed based on the detected position of the object and the second motion blur amounts computed based on the object vector. The relative reliability determination unit 112 outputs the determined relative reliabilities to the filter control unit 113.

With use of FIG. 9, a description is now given of an example of a method of determining the relative reliabilities based on the object information, which is executed by the relative reliability determination unit 112. FIG. 9 shows a relationship between the conditions that respectively correspond to the types of object information and the relative reliabilities of the first and second motion blur amounts for a case where the conditions have been satisfied.

In a case where the object has been determined to be a deformable object, there is a possibility that the corresponding object vector includes not only a vector indicating a motion of the entire object, but also a vector indicating a motion of an area of the object. Therefore, the relative reliability determination unit 112 determines that the reliability of the second motion blur amounts computed based on the object vector is relatively low compared to the reliability of the first motion blur amounts computed based on the detected position of the object.

In a case where the reliability of the object detection is lower than a predetermined threshold, it is considered that the reliability of the detected position of the object is also low. Therefore, the relative reliability determination unit 112 determines that the reliability of the first motion blur amounts computed from the detected position of the object is relatively low compared to the reliability of the second motion blur amounts computed from the object vector.

In a case where the reliability of the object vector is lower than a predetermined threshold, the relative reliability determination unit 112 determines that the reliability of the second motion blur amounts computed from the object vector is relatively low compared to the reliability of the first motion blur amounts computed from the detected position of the object.

The relative reliability determination unit 112 may use the determination results corresponding to one of the items of the aforementioned object information as the final relative reliabilities. For example, the relative reliability determination unit 112 can use, as the final relative reliabilities, the determination results corresponding to an item for which the highest priority has been determined in advance among the items of the object information.

Alternatively, the relative reliability determination unit 112 may determine the final relative reliabilities based on the determination results corresponding to at least two of the items of the aforementioned object information. In a case where the final relative reliabilities are determined using the determination results related to a plurality of items, the relative reliability determination unit 112 performs weighted averaging of the reliabilities of the first motion blur amounts and the reliabilities of the second motion blur amounts obtained for the respective items of object information, and uses the resultant averages as the final reliabilities.

For example, the relative reliability determination unit 112 converts each of a relatively high reliability and a relatively low reliability into a numerical value so that a sum of the numerical values is one. It is assumed here that the relatively high reliability and the relatively low reliability are converted into 0.7 and 0.3, respectively. Then, the relative reliability determination unit 112 determines the weights for the respective items (a sum thereof is one).

For example, a weight of W1, a weight of W2, and a weight of W3 are given to the item "deformable object", the item "reliability of the object detection", and the item "reliability of the object vector", respectively. What kind of values are assigned to W1 to W3 is determined in advance. The relative reliability determination unit 112 computes the reliabilities of the motion blur amounts by performing weighted addition of the reliabilities corresponding to the respective items based on whether the conditions of the respective items shown in FIG. 9 have been satisfied.

For example, provided that the reliabilities corresponding to the respective items are R11, R12, and R13, the reliability R1 of the first motion blur amounts can be obtained using the following formula (5). The reliability R2 of the second motion blur amounts is relative to the reliability R1, and can therefore be obtained using formula (6).

$$R1 = W1 \times R11 + W2 \times R12 + W3 \times R13 \tag{5}$$

$$R2 = 1 - R1 \tag{6}$$

Specifically, in a case where the object has been determined to be a deformable object, the reliability of the object detection is not low, and the reliability of the object vector is low, the reliability R1 is computed as follows.

$$R1 = W1 \times 0.7 + W2 \times 0.7 + W3 \times 0.3$$

The relative reliability determination unit 112 may cause the weights W1 to W3 for the respective items of the object information and/or the numerical values assigned to a relatively high reliability and a relatively low reliability to vary in accordance with the type of the object obtained from the object detection unit 104. The relative reliability determination unit 112 outputs, for example, the reliability R1 of the first motion blur amounts or the reliability R2 of the second motion blur amounts as the relative reliability to the filter control unit 113.

Based on the relative reliability of the motion blur amounts obtained from the relative reliability determination unit 112, the filter control unit 113 determines the cutoff frequencies of the first filter unit 106 and the second filter unit 109. The filter control unit 113 notifies the filter units of the corresponding cutoff frequencies that have been determined.

Figure 10:
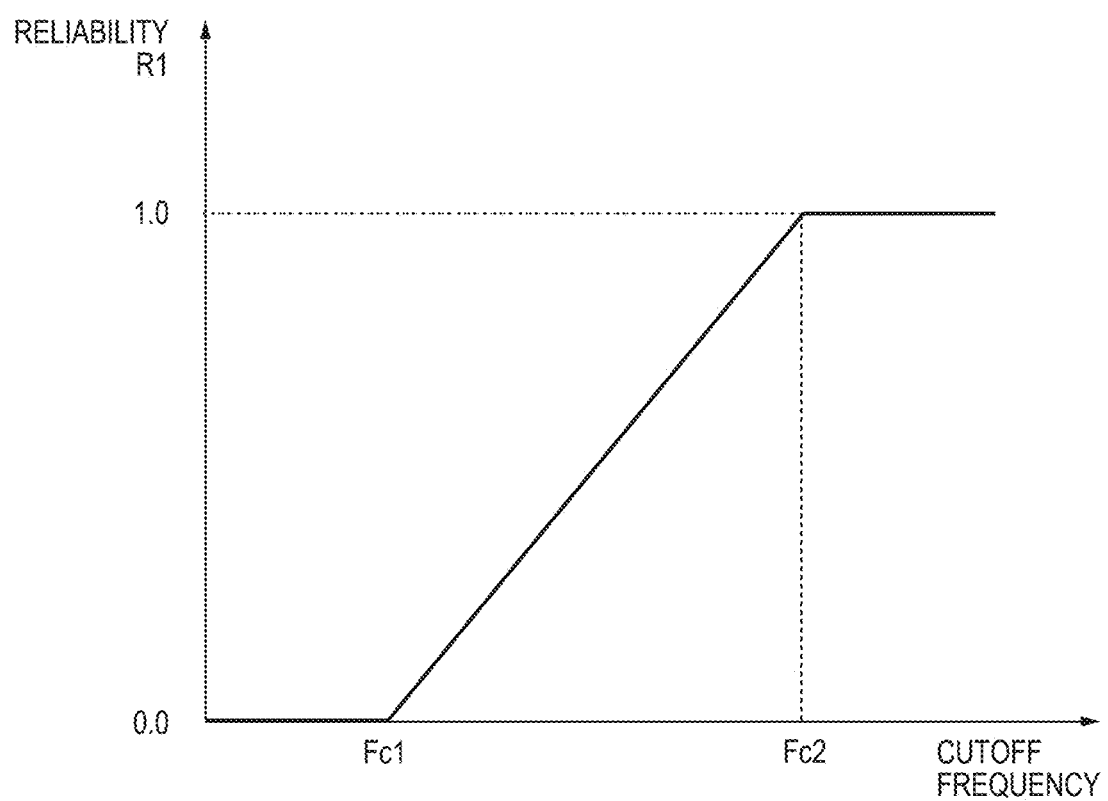
FIG. 10 is a diagram showing an example of a relationship between a reliability and a cutoff frequency that can be used in embodiments.

The filter control unit 113 can determine the cutoff frequencies based on, for example, a relationship between the relative reliability and the cutoff frequency that has been registered in advance. FIG. 10 shows one example of a relationship between the reliability R1 of the first motion blur amounts and the cutoff frequency. In FIG. 10, the horizontal axis indicates the cutoff frequency of the first filter unit 106, and the vertical axis indicates the reliability R1. In this example, a lower limit value Fc1 and an upper limit value Fc2 are set for the cutoff frequency; the cutoff frequency is Fc1 when the reliability R1 has the smallest value of 0, and the cutoff frequency is Fc2 when the reliability R1 has the largest value of 1. Here, the cutoff frequency increases linearly with an increase in the reliability; however, the cutoff frequency may increase non-linearly or discontinuously with an increase in the reliability. The lower limit value Fc1 and the upper limit value Fc2 of the cutoff frequency are set so that they satisfy the condition Fc2>Fc1 to the extent that they can be set in the filter units. Note that the upper limit value Fc2 is set in accordance with the sampling theorem to the extent that it does not exceed the sampling frequency/2.

The frequency band of the first motion blur amounts included in the motion blur correction amounts can be expanded by setting a higher cutoff frequency in the first filter unit 106 (low-pass filter) for a higher reliability R1 of the first motion blur amounts. In the present embodiment, the filter control unit 113 determines the same, or substantially the same cutoff frequency with respect to the first filter unit 106 and the second filter unit 109. The filter control unit 113 sets, for example, the cutoff frequency determined based on the reliability R1 of the first motion blur amounts in both of the first filter unit 106 and the second filter unit 109. As a result, the output frequency bands of the first filter unit 106 and the second filter unit 109 are practically continuous frequency bands.

The motion blur correction amount computation unit 114 computes the motion blur correction amounts by adding the low-frequency components of the first motion blur amounts output from the first filter unit 106 and the high-frequency components of the second motion blur amounts output from the second filter unit 109 for each direction component. The motion blur correction amount computation unit 114 outputs the motion blur correction amounts to the control unit 120.

Based on the motion blur correction amounts computed by the motion blur correction amount computation unit 114, the control unit 120 executes at least one of optical motion blur correction and electronic motion blur correction. In a case where the optical motion blur correction is executed, the control unit 120 drives at least one of the blur correction lens included in the optical system 101 and the image sensor included in the image capture unit 102 so as to bring the position of the object close to a target position within a shooting range. In a case where the electronic motion blur correction is executed, the control unit 120 controls a cut-out position of a captured image so as to bring the position of the object close to a target position within a shooting range.

(Motion Blur Correction Operation During Shooting of Moving Images)

Next, a motion blur correction operation in the image capture apparatus 100 will be described using a flowchart shown in FIG. 2. The operation described below is executed during shooting of moving images in a case where motion blur correction is enabled on the image capture apparatus 100. The purpose of shooting of moving images may be, for example, live-view display executed during a shooting standby, or may be recording of moving images.

In step S201, the object detection unit 104 executes object detection processing that uses a trained model with respect to image data of one frame output from the development processing unit 103. For each object region that has been detected, the object detection unit 104 outputs the position of the object region to the first motion blur amount computation unit 105, the type of the object to the deformable object determination unit 110, and the type of the object and the detection reliability to the object information obtainment unit 111. Position information of the detected object is output.

In step S202, the first motion blur amount computation unit 105 computes a difference between the detected position obtained from the object detection unit 104 and a target position of the object, which has been set in advance as image coordinates, as a first motion blur amount. The first motion blur amount computation unit 105 outputs the first motion blur amount to the first filter unit 106.

In step S203, the object vector detection unit 107 detects a vector (an object vector) indicating a motion of the object between frames and the reliability thereof from image data corresponding to two frames output from the development processing unit 103.

In step S204, the second motion blur amount computation unit 108 obtains a second motion blur amount based on a plurality of object vectors that have been obtained from the object vector detection unit 107 in step S203. The second motion blur amount computation unit 108 can obtain the second motion blur amount by using, for example, a histogram of direction-by-direction magnitudes of the object vectors as described above.

In step S205, the deformable object determination unit 110 determines whether the object is a deformable object based on at least one of the type of the object obtained from the object detection unit 104 and the object vector obtained from the object vector detection unit 107. A deformable object is an object whose object region can significantly deform in shape between frames.

In step S206, the object information obtainment unit 111 obtains object information from the object detection unit 104, the object vector detection unit 107, and the deformable object determination unit 110.

In step S207, the relative reliability determination unit 112 determines the relative reliabilities of the detected position of the object and the object vector, in other words, the relative reliabilities of the first motion blur amount and the second motion blur amount, based on the object information obtained from the object information obtainment unit 111.

In step S208, the filter control unit 113 determines the cutoff frequency of the first filter unit 106 and the cutoff frequency of the second filter unit 109 based on the reliability of the first motion blur amount and the reliability of the second motion blur amount obtained from the relative reliability determination unit 112. Then, the filter control unit 113 sets the determined cutoff frequencies in the first filter unit 106 and the second filter unit 109, respectively.

In step S209, the first filter unit 106 applies low-pass filter processing with the cutoff frequency notified from the filter control unit 113 to the first motion blur amount obtained from the first motion blur amount computation unit 105. The first filter unit 106 outputs the extracted low-frequency components (a third motion blur amount) of the first motion blur amount to the motion blur correction amount computation unit 114.

In step S210, the second filter unit 109 applies high-pass filter processing with the cutoff frequency notified from the filter control unit 113 to the second motion blur amount obtained from the second motion blur amount computation unit 108. The second filter unit 109 outputs the extracted high-frequency components (a fourth motion blur amount) of the second motion blur amount to the motion blur correction amount computation unit 114.

In step S211, the motion blur correction amount computation unit 114 computes a motion blur correction amount by adding the third motion blur amount obtained from the first filter unit 106 and the fourth motion blur amount obtained from the second filter unit 109. The motion blur correction amount computation unit 114 outputs the motion blur correction amount to the control unit 120.

In step S212, based on the motion blur correction amount obtained from the motion blur correction amount computation unit 114, the control unit 120 executes motion blur correction so as to bring the position of the object in an image capture range close to the target position during the exposure period of the image sensor. The control unit 120 can execute at least one of optical correction in which a shooting range is moved by driving the correction lens and/or the image sensor, and electronic correction in which a range to be cut out from a captured image is moved.

In step S213, the control unit 120 determines whether the shooting of moving images has finished. The control unit 120 controls the motion blur correction control apparatus to end the motion blur correction operation when it has been determined that the shooting of moving images has finished, and to repeatedly execute processing from step S201 when it has not been determined that the shooting of moving images has finished.

The first embodiment determines the cutoff frequencies for extracting frequency components to be used in the computation of the motion blur correction amount so that the frequency components of the motion blur amount with a relatively high reliability are more reflected in the motion blur correction amount. In the present embodiment, the accuracy of motion blur correction can be increased by using the motions (blur amounts) of the object that have been detected using a plurality of methods based on appropriate percentages (weights) corresponding to the relative reliabilities.

Second Embodiment

Next, a second embodiment will be described. The present embodiment differs from the first embodiment in a method of computing a motion blur correction amount from a first motion blur amount and a second motion blur amount. Therefore, the description will be provided with a focus on the differences from the first embodiment.

Figure 11:
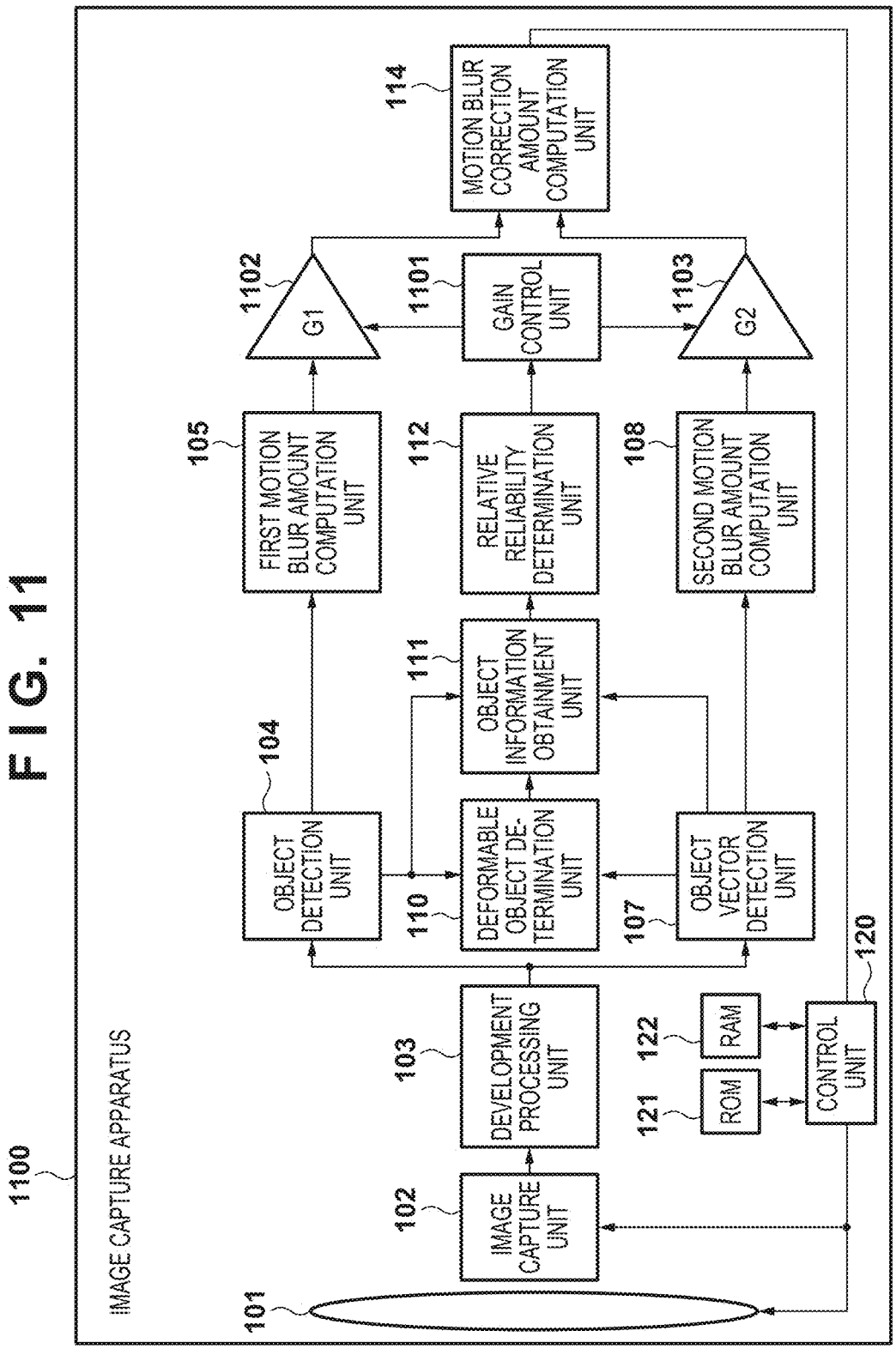
FIG. 11 is a block diagram showing an exemplary functional configuration of an image capture apparatus that includes a motion blur correction control apparatus according to a second embodiment.

FIG. 11 is a block diagram showing an exemplary functional configuration of an image capture apparatus 1100 that includes a motion blur correction control apparatus according to the second embodiment. In FIG. 11, among the constituent elements included in the image capture apparatus 1100, the constituent elements related to motion blur correction are shown as functional blocks, similarly to FIG. 1. Furthermore, the constituent elements similar to those of the image capture apparatus 100 described in the first embodiment are given the same reference numerals as FIG. 1, and a description thereof is omitted.

The image capture apparatus 1100 has a configuration in which the first filter unit 106, the second filter unit 109, and the filter control unit 113 in the image capture apparatus 100 are replaced with a first gain processing unit 1102, a second gain processing unit 1103, and a gain control unit 1101.

The gain control unit 1101 determines gains to be applied in the first gain processing unit 1102 and the second gain processing unit 1103 based on the reliability of the first motion blur amount and the relative reliability of the second motion blur amount obtained from the relative reliability determination unit 112. The gain control unit 1101 also sets the determined gains in the first gain processing unit 1102 and the second gain processing unit 1103, respectively.

The gain control unit 1101 determines a first gain G1 to be applied to the first motion blur amount, and a second gain G2 to be applied to the second motion blur amount. The first gain G1 and the second gain G2 have a value that is equal to or larger than 0 and equal to or smaller than 1, and a sum of G1 and G2 is 1. In this way, the gain control unit 1101 determines relative weights for the first motion blur amount and the second motion blur amount used in the computation of the motion blur correction amount.

Figure 13:
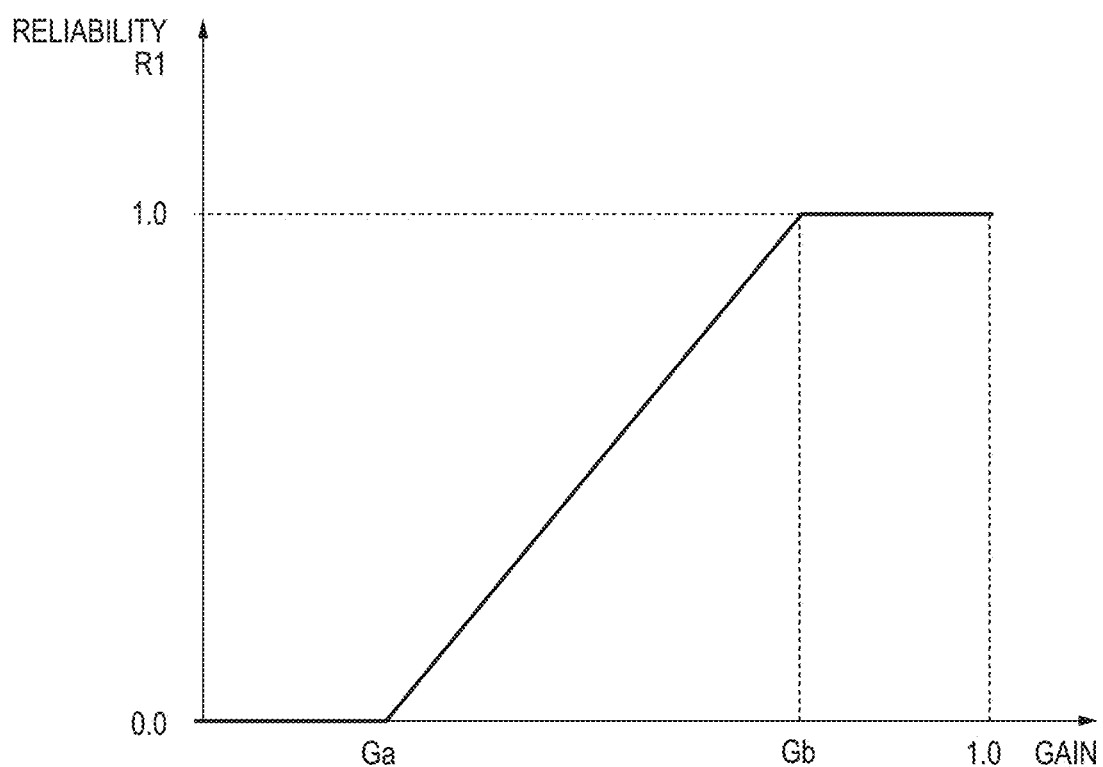
FIG. 13 is a diagram showing an example of a relationship between a reliability and a gain that can be used in embodiments.

The gain control unit 1101 can determine the gains based on, for example, a relationship between a relative reliability and a gain that has been registered in advance. FIG. 13 shows one example of a relationship between the reliability R1 of the first motion blur amount and the gain. In FIG. 13, the horizontal axis indicates the first gain G1 applied in the first gain processing unit 1102, and the vertical axis indicates the reliability R1. In this example, a lower limit value Ga and an upper limit value Gb are set for the gain; the first gain G1 is Ga when the reliability R1 has the smallest value of 0, and the first gain G1 is Gb when the reliability R1 has the largest value of 1. Here, the gain increases linearly with an increase in the reliability; however, the gain may increase non-linearly or discontinuously with an increase in the reliability. The values under $0 \leq Ga$ and $Gb \leq 1$ can be taken as long as $Ga < Gb$ and $Ga + Gb = 1$ are satisfied.

The gain control unit 1101 determines the first gain G1 so that its value increases as the reliability R1 of the first motion blur amount increases. Note that the gain control unit 1101 can determine the second gain G2 as a value obtained by subtracting G1 from 1 (G2=1−G1). As a result of determining the first gain G1 and the second gain G2 in the foregoing manner, the percentage (weight) of one of the first and second motion blur amounts that has a higher relative reliability in the motion blur correction amount becomes larger than the percentage (weight) of the other in the motion blur correction amount.

The first gain processing unit 1102 is, for example, a multiplier that multiplies an input signal by a gain. The first gain processing unit 1102 applies the first gain G1 set by the gain control unit 1101 to the first motion blur amount. The first gain processing unit 1102 outputs the first motion blur amount to which the first gain G1 has been applied to the motion blur correction amount computation unit 114.

The second gain processing unit 1103 is, for example, a multiplier that multiplies an input signal by a gain. The second gain processing unit 1103 applies the second gain G2 set by the gain control unit 1101 to the second motion blur amount. The second gain processing unit 1103 outputs the second motion blur amount to which the second gain G2 has been applied to the motion blur correction amount computation unit 114.

The motion blur correction amount computation unit 114 computes a motion blur correction amount by adding the first motion blur amount to which the first gain G1 has been applied and the second motion blur amount to which the second gain G2 has been applied. As such, the motion blur correction amount computed in the present embodiment is equivalent to a weighted average value of the first motion blur amount and the second motion blur amount. A larger weight is given to the motion blur amount with a relatively high reliability than to the motion blur amount with a relatively low reliability; consequently, the accuracy of the motion blur correction amount can be increased.

(Motion Blur Correction Operation During Shooting of Moving Images)

Figure 12:
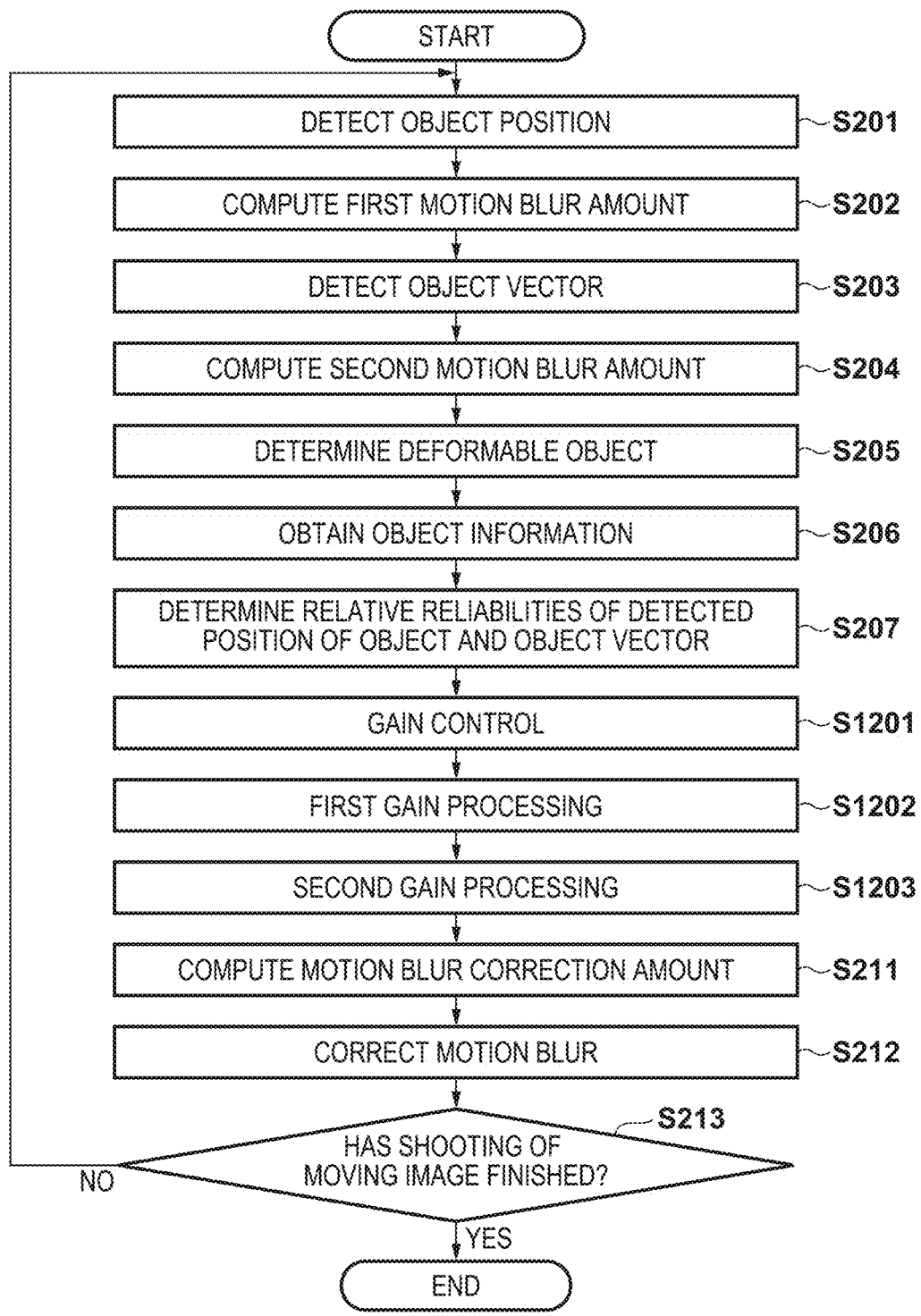
FIG. 12 is a flowchart related to a motion blur correction operation according to the second embodiment.

Next, a motion blur correction operation in the image capture apparatus 1100 will be described using a flowchart shown in FIG. 12. The conditions for the execution of the motion blur correction operation may be the same as those of the first embodiment. In FIG. 12, the steps that execute the same operations as those of the first embodiment are given the same reference numerals as FIG. 2, and a description thereof is omitted.

The operations of steps S201 to S206 are the same as those of the first embodiment. In step S207, the relative reliability determination unit 112 outputs the relative reliabilities that have been determined in the above-described manner to the gain control unit 1101.

In step S1201, the gain control unit 1101 determines the first gain G1 and the second gain G2 in the above-described manner based on the reliability of the first motion blur amount and the reliability of the second motion blur amount obtained from the relative reliability determination unit 112. The gain control unit 1101 sets the first gain G1 in the first gain processing unit 1102, and sets the second gain G2 in the second gain processing unit 1103.

In step S1202, the first gain processing unit 1102 applies the first gain G1 to (executes first gain processing with respect to) the first motion blur amount. The first gain processing unit 1102 outputs the first motion blur amount to which the first gain G1 has been applied to the motion blur correction amount computation unit 114.

In step S1203, the second gain processing unit 1103 applies the second gain G2 to (executes second gain processing with respect to) the second motion blur amount. The second gain processing unit 1103 outputs the second motion blur amount to which the second gain G2 has been applied to the motion blur correction amount computation unit 114. The operations of step S211 onward are the same as those of the first embodiment.

The second embodiment determines the gains that are applied to the respective motion blur amounts so that the motion blur amount with a relatively high reliability is more reflected in the motion blur correction amount. In the present embodiment, too, the accuracy of motion blur correction can be increased by using the motions (blur amounts) of the object that have been detected using a plurality of methods based on appropriate percentages (weights) corresponding to the relative reliabilities.

Third Embodiment

Next, a third embodiment will be described. The present embodiment differs from the first and second embodiments in that camera shake correction is executed in addition to motion blur correction.

Figure 14:
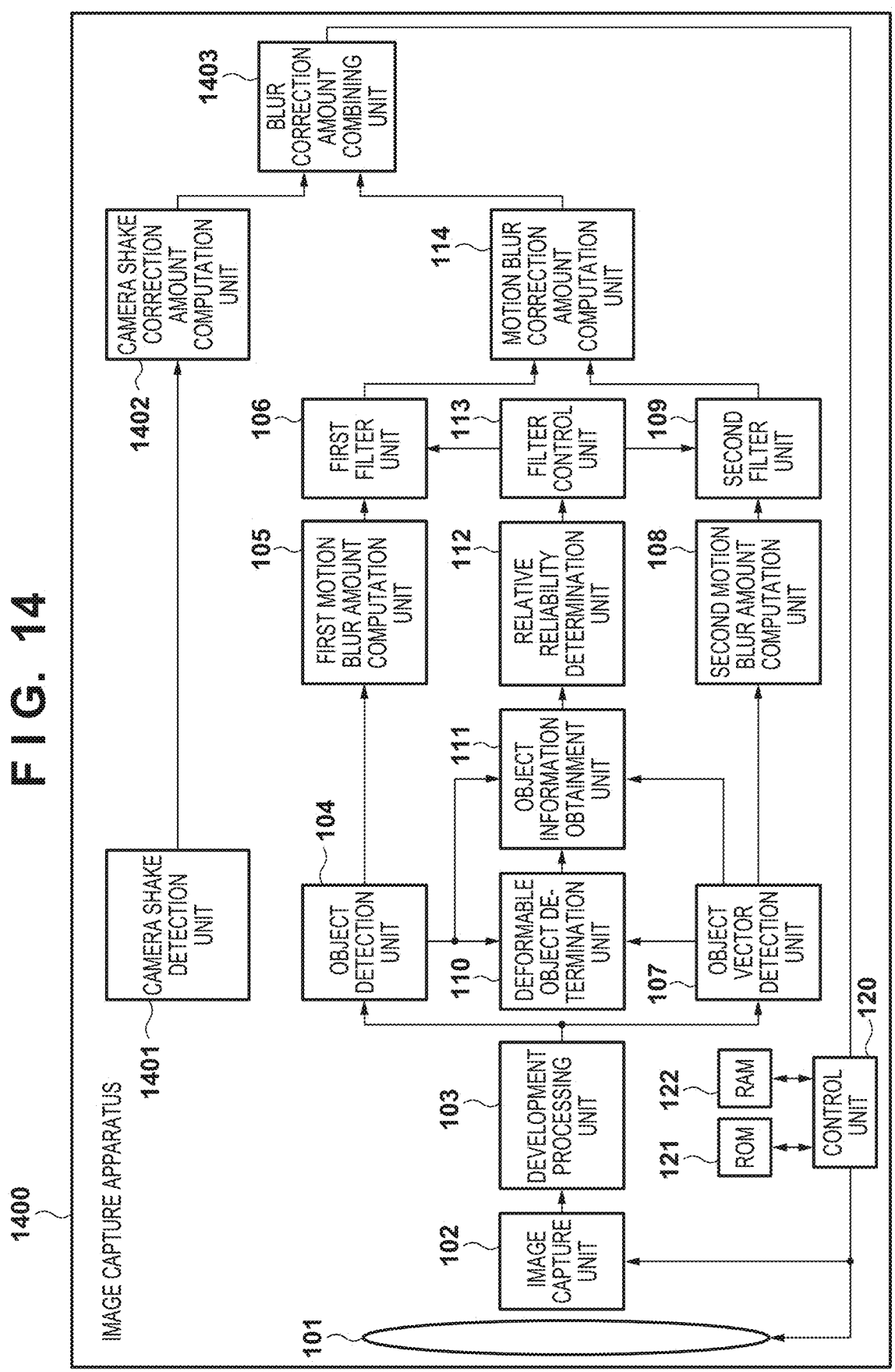
FIG. 14 is a block diagram showing an exemplary functional configuration of an image capture apparatus according to a third embodiment.

FIG. 14 is a block diagram showing an exemplary functional configuration of an image capture apparatus 1400 according to the third embodiment. In FIG. 14, among the constituent elements included in the image capture apparatus 1400, the constituent elements related to correction of a camera shake and a motion blur are shown as functional blocks. Furthermore, the constituent elements similar to those of the image capture apparatus 100 described in the first embodiment are given the same reference numerals as FIG. 1, and a description thereof is omitted.

The image capture apparatus 1400 includes a camera shake detection unit 1401, a camera shake correction amount computation unit 1402, and a blur correction amount combining unit 1403 in addition to the constituents of the image capture apparatus 100. The configuration and operations of the image blur correction control apparatus are the same as those of the first embodiment, except that the output destination of a motion blur correction amount is the blur correction amount combining unit 1403 in place of the control unit 120. The configuration of the image blur correction control apparatus may be changed to that according to the second embodiment.

The camera shake detection unit 1401 is, for example, a gyroscope, and outputs signals indicating a motion of the image capture apparatus 1400 (here, signal of angular velocities around the respective axes of the Cartesian coordinate system) to the camera shake correction amount computation unit 1402. Note that the motion of the image capture apparatus 1400 may be detected using other known methods. For example, a background vector separated by the object vector detection unit 107 may be used as the motion of the image capture apparatus 1400.

The camera shake correction amount computation unit 1402 converts the signals obtained from the camera shake detection unit 1401 into a motion of the image capture apparatus 1400. The camera shake correction amount computation unit 1402 computes, for each of the X direction and the Y direction, a camera shake correction amount for driving the blur correction lens so as to cancel out the motion of the image capture apparatus 1400. The camera shake correction amount computation unit 1402 outputs the computed camera shake correction amounts to the blur correction amount combining unit 1403.

The camera shake correction amount computation unit 1402 converts the angular velocities in the yaw direction and the pitch direction, which are obtained from the camera shake detection unit 1401, respectively into angles θy and θp by integrating them. The camera shake correction amount computation unit 1402 converts the angles θy and θp into the displacement amounts V1x and V1y on the image capture plane, and sets them as the camera shake correction amount in the X direction and the camera shake correction amount in the Y direction. Provided that the focal length of the optical system 101 is f [mm], the displacement amounts V1x and V1y can be computed as V1x=f tan (θy) and V1y=f tan (θp).

The blur correction amount combining unit 1403 computes a final blur correction amount by combining the motion blur correction amounts computed in the motion blur correction amount computation unit 114 and the camera shake correction amounts computed in the camera shake correction amount computation unit 1402. The blur correction amount combining unit 1403 outputs the computed blur correction amount to the control unit 120.

The blur correction amount combining unit 1403 combines the motion blur correction amounts and the camera shake correction amounts using weights. A method of combining the motion blur correction amounts and the camera shake correction amounts is not limited in particular, and any known method can be used thereas. As one example, different frequency bands can be extracted and combined. Specifically, the blur correction amount combining unit 1403 can combine the correction amounts by performing weighted addition of low-frequency components of the motion blur correction amounts and high-frequency components of the camera shake correction amounts based on the reliability of object tracking.

The blur correction amount combining unit 1403 can extract the low-frequency components by applying low-pass filter processing to the motion blur correction amounts, and extract the high-frequency components by applying high-pass filter processing to the camera shake correction amounts. The blur correction amount combining unit 1403 can control the ratio (weights) of combination of the correction amounts by controlling the cutoff frequency that is shared by a low-pass filter and a high-pass filter, similarly to the filter control unit 113.

Specifically, the blur correction amount combining unit 1403 can reduce the cutoff frequency as the reliability of object detection decreases. Consequently, the lower the reliability of object detection, the smaller the weight for the low-frequency components of the motion blur correction amounts, and the larger the weight for the high-frequency components of the camera shake correction amounts. Alternatively, the cutoff frequency may be reduced as the reliability of the object vector decreases.

(Motion Blur Correction Operation During Shooting of Moving Images)

Figure 15:
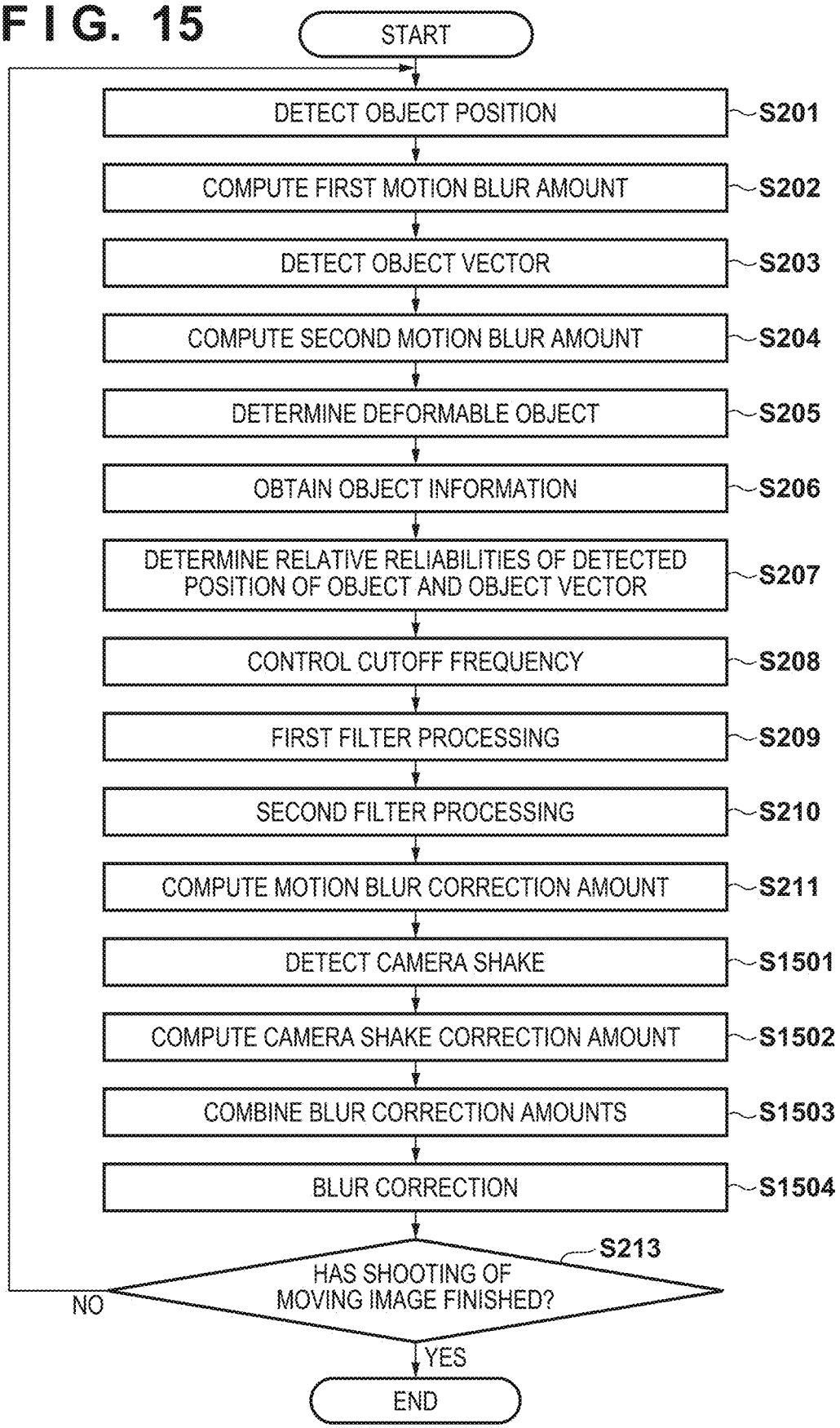
FIG. 15 is a flowchart related to a motion blur correction operation according to the third embodiment.

Next, a blur correction operation in the image capture apparatus 1400 will be described using a flowchart shown in FIG. 15. The conditions for the execution of the motion blur correction operation may be the same as those of the first embodiment. Furthermore, it is assumed that camera shake correction has been enabled as well. In FIG. 15, the steps that execute the same operations as those of the first embodiment are given the same reference numerals as FIG. 2, and a description thereof is omitted.

The operations of steps S201 to S211 are the same as those of the first embodiment. In step S211, the motion blur correction amount computation unit 114 outputs the computed motion blur correction amounts to the blur correction amount combining unit 1403.

In step S1501, the camera shake detection unit 1401 detects a motion of the image capture apparatus 1400.

In step S1502, the camera shake correction amount computation unit 1402 computes the camera shake correction amounts for correcting the motion detected by the camera shake detection unit 1401. The camera shake correction amount computation unit 1402 outputs the computed camera shake correction amounts to the blur correction amount combining unit 1403.

Note that steps S1501 to S1502 may be executed prior to steps S201 to S211, or in parallel with steps S201 to S211.

In step S1503, the blur correction amount combining unit 1403 computes a final blur correction amount by combining the motion blur correction amounts computed in step S211 and the camera shake correction amounts computed in step S1502. The blur correction amount combining unit 1403 outputs the computed blur correction amount to the control unit 120.

In step S1504, the control unit 120 executes optical or electronic blur correction with use of the blur correction amount obtained from the blur correction amount combining unit 1403. The operations of the control unit 120 may be the same as step S212, except that the used correction amount is different.

The third embodiment uses a blur correction amount obtained by combining the motion blur correction amounts obtained in the first or second embodiment and the camera shake correction amounts. According to the present embodiment, the advantageous effects of the first or second embodiment can be achieved while executing the camera shake correction.

Fourth Embodiment

Next, a fourth embodiment will be described. In the present embodiment, a motion blur correction amount is computed in accordance with a combination of the first embodiment and the second embodiment.

Figure 16:
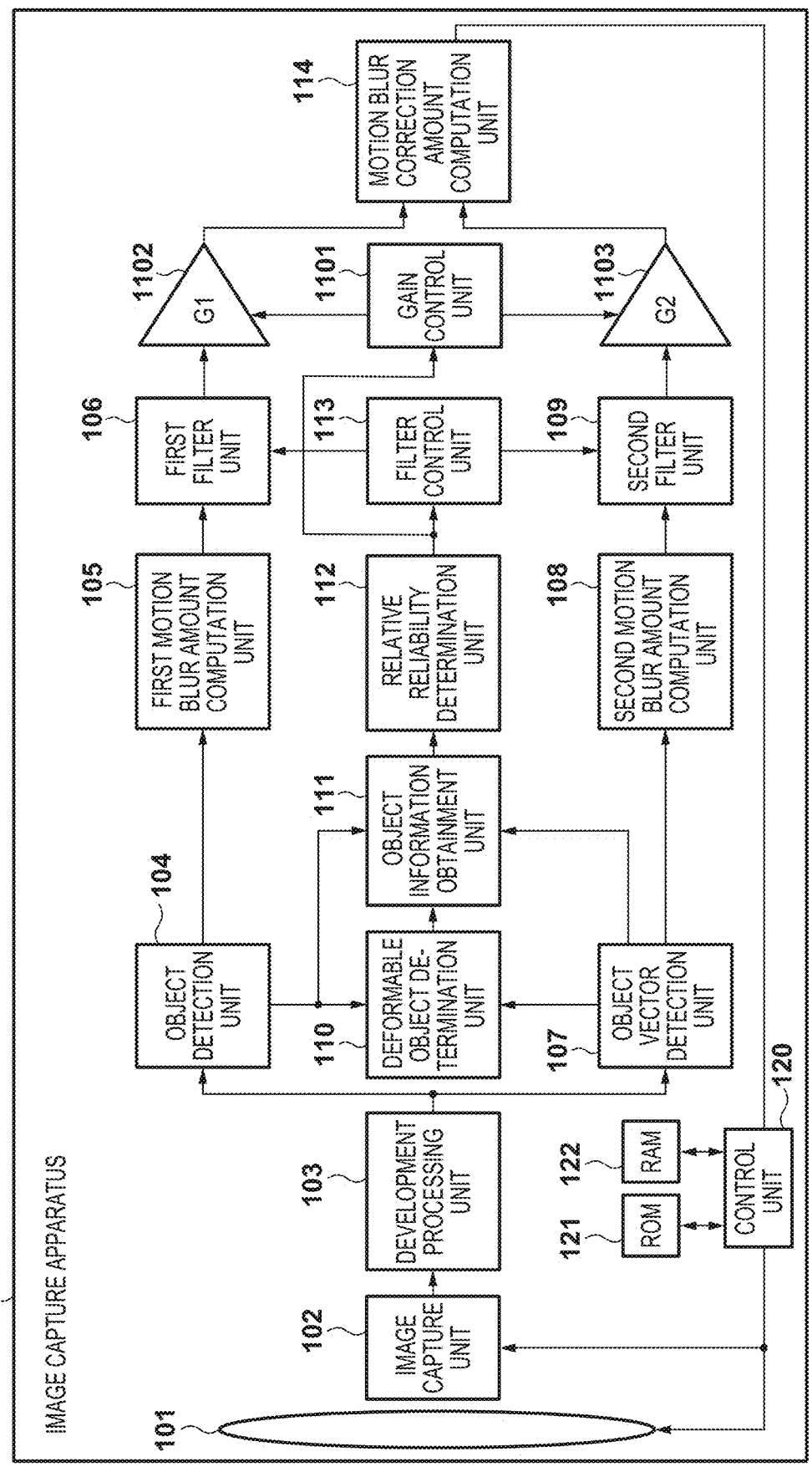
FIG. 16 is a block diagram showing an exemplary functional configuration of an image capture apparatus that includes a motion blur correction control apparatus according to a fourth embodiment.

FIG. 16 is a block diagram showing an exemplary functional configuration of an image capture apparatus 1600 according to the fourth embodiment. In FIG. 16, among the constituent elements included in the image capture apparatus 1400, the constituent elements related to motion blur correction are shown as functional blocks. Furthermore, the constituent elements similar to those of the image capture apparatuses 100 and 1100 described in the first and second embodiments are given the same reference numerals as FIG. 1 and FIG. 11, and a description thereof is omitted.

The image capture apparatus 1600 has a configuration in which the first gain processing unit 1102, the second gain processing unit 1103, and the gain control unit 1101 are added to the constituents of the image capture apparatus 100. Note that the first gain processing unit 1102 applies the first gain G1 to the output from the first filter unit 106. Also, the second gain processing unit 1103 applies the second gain G2 to the output from the second filter unit 109.

Note that the order of the first filter unit 106 and the first gain processing unit 1102 may be reversed so that a first motion blur amount is input to the first gain processing unit 1102 and the output from the first gain processing unit 1102 is input to the first filter unit 106. Similarly, the order of the second filter unit 109 and the second gain processing unit 1103 may be reversed so that a second motion blur amount is input to the second gain processing unit 1103 and the output from the second gain processing unit 1103 is input to the second filter unit 109.

(Motion Blur Correction Operation During Shooting of Moving Images)

Figure 2:
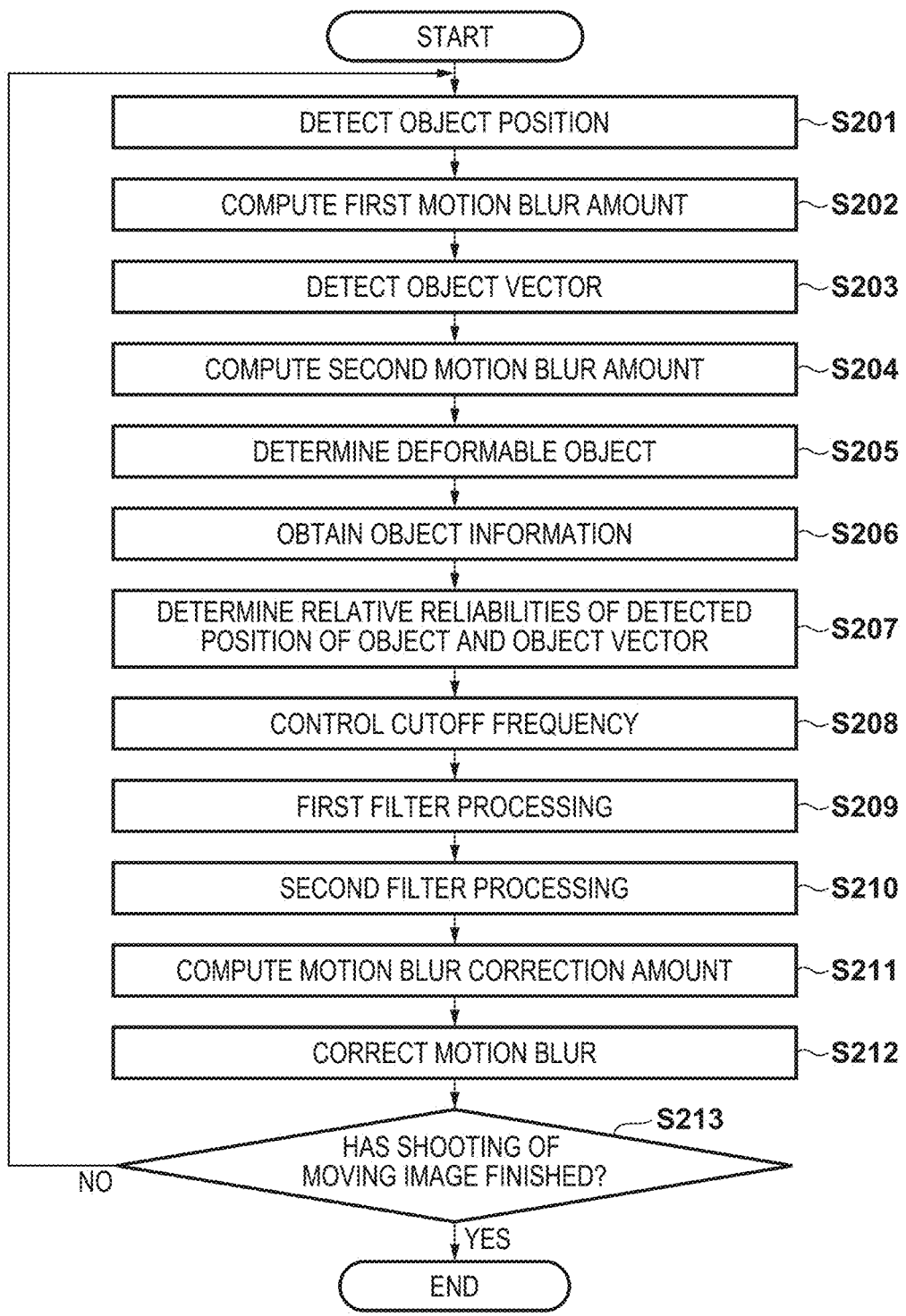
FIG. 2 is a flowchart related to a motion blur correction operation according to the first embodiment.
Figure 17:
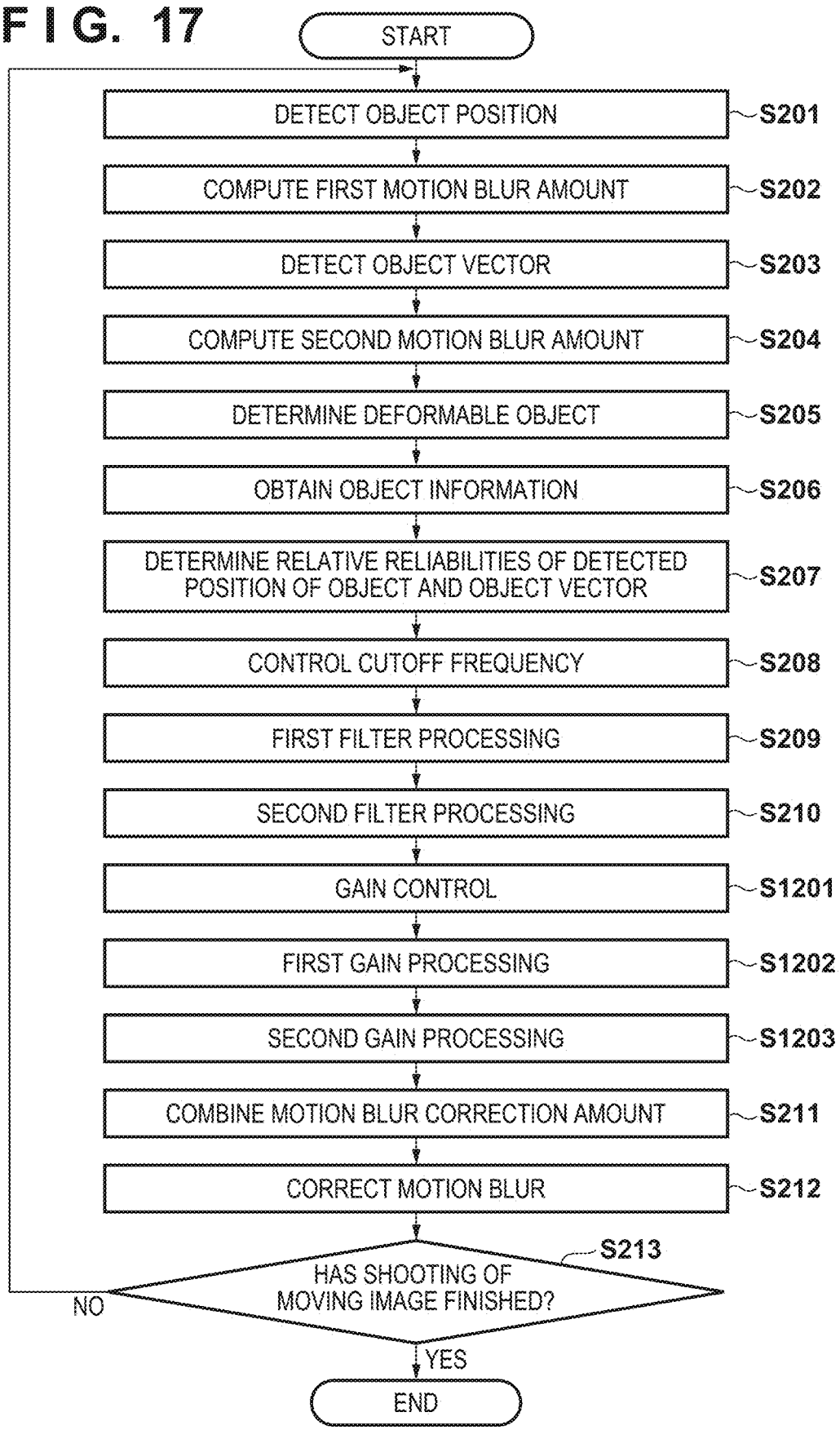
FIG. 17 is a flowchart related to a motion blur correction operation according to the fourth embodiment.

A flowchart shown in FIG. 17 indicates a motion blur correction operation in the image capture apparatus 1600, which includes steps S1201 to S1203 of FIG. 12 added between steps S210 and S211 of the flowchart shown in FIG. 2. The operation in each step is as described in relation to the first embodiment or the second embodiment.

The fourth embodiment determines the cutoff frequencies of filters applied to the motion blur amounts and the gains applied to the motion blur amounts so that the motion blur amount with a relatively high reliability is more reflected in the motion blur correction amount. In the present embodiment, too, the accuracy of motion blur correction can be increased by using the motions (blur amounts) of the object that have been detected using a plurality of methods based on appropriate percentages (weights) corresponding to the relative reliabilities.

OTHER EMBODIMENTS

Note that similarly to the third embodiment, the image capture apparatus 1600 of the fourth embodiment may additionally include the constituents related to camera shake correction, and execute blur correction based on a combined blur correction amount obtained from a motion blur correction amount and a camera shake correction amount.

The above embodiments have been described in relation to a configuration that computes a motion blur amount before the filter processing and the gain processing are applied. However, the filter processing and the gain processing may be applied before the motion blur amount is computed. For example, the arrangements of the first filter unit 106 and the first motion blur amount computation unit 105 may be switched, and the arrangements of the first gain processing unit 1102 and the first motion blur amount computation unit 105 may be switched. Similarly, the arrangements of the second filter unit 109 and the second motion blur amount computation unit 108 may be switched, and the arrangements of the second gain processing unit 1103 and the second motion blur amount computation unit 108 may be switched.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the scope of the claims is not limited to the disclosed exemplary embodiments. The scope of the claims is to be accorded the broadest interpretation so as to encompass all such modifications and equivalent structures and functions.

This application claims the benefit of Japanese Patent Application No. 2023-111582, filed Jul. 6, 2023, which is hereby incorporated by reference herein in its entirety.

What is claimed is:

1. A control apparatus that obtains a correction amount for correcting a motion blur attributed to a motion of an object, the control apparatus comprising:
  one or more processors that execute a program stored in a memory and thereby function as:
  a first computation unit configured to compute a first motion blur amount based on a position of an object region in a captured image;
  a second computation unit configured to compute a second motion blur amount based on an object vector indicating a motion of an object between captured images; and
  a correction amount computation unit configured to obtain a motion blur correction amount by adding the first motion blur amount and the second motion blur amount with use of weights corresponding to relative reliabilities of the first motion blur amount and the second motion blur amount.

2. The control apparatus according to claim 1, wherein the one or more processors further function as:
  a determination unit configured to determine the relative reliabilities based on one or more items selected from among a detection reliability of the object region, a reliability of the object vector, and a type of the object.

3. The control apparatus according to claim 2, wherein in a case where the object is an object of a predetermined type whose object region may significantly change in shape between captured images, the determination unit determines the reliability of the first motion blur amount to be relatively high compared to the reliability of the second motion blur amount.

4. The control apparatus according to claim 3, wherein in a case where the object region is a region of the object of the predetermined type, the determination unit determines the reliability of the first motion blur amount to be relatively high compared to the reliability of the second motion blur amount.

5. The control apparatus according to claim 3, wherein in a case where there is a plurality of object vectors that has been detected and a variance of the plurality of object vectors is equal to or larger than a threshold, the determination unit determines the reliability of the first motion blur amount to be relatively high compared to the reliability of the second motion blur amount.

6. The control apparatus according to claim 2, wherein in a case where the detection reliability of the object region is lower than a threshold, the determination unit determines the reliability of the first motion blur amount to be relatively low compared to the reliability of the second motion blur amount.

7. The control apparatus according to claim 2, wherein
in a case where the reliability of the object vector is lower than a threshold, the determination unit determines the reliability of the first motion blur amount to be relatively high compared to the reliability of the second motion blur amount.

8. The control apparatus according to claim 2, wherein
in a case where the determination unit determines the relative reliabilities based on two or more items selected from among the detection reliability of the object region, the reliability of the object vector, and the type of the object, the determination unit determines final relative reliabilities by performing weighted averaging of relative reliabilities of the first motion blur amounts and the second motion blur amounts that have been determined based on the respective items.

9. The control apparatus according to claim 2, wherein
in a case where the determination unit determines the relative reliabilities based on two or more items selected from among the detection reliability of the object region, the reliability of the object vector, and the type of the object, the determination unit sets relative reliabilities of the first motion blur amount and the second motion blur amount that have been determined based on an item for which the highest priority has been determined in advance as final relative reliabilities.

10. The control apparatus according to claim 1, wherein
the correction amount computation unit obtains the motion blur correction amount by adding low-frequency components of the first motion blur amount and high-frequency components of the second motion blur amount, and
the one or more processors further function as:
  a filter control unit configured to control a cutoff frequency of a low-pass filter that extracts the low-frequency components and a high-pass filter that extracts the high-frequency components in accordance with the relative reliabilities.

11. The control apparatus according to claim 1, wherein
the correction amount computation unit obtains the motion blur correction amount by adding the first motion blur amount to which a first gain has been applied and the second motion blur amount to which a second gain has been applied, and
the one or more processors further function as:
  a gain control unit configured to control the first gain and the second gain in accordance with the relative reliabilities.

12. The control apparatus according to claim 1, wherein
the correction amount computation unit obtains the motion blur correction amount by adding low-frequency components of the first motion blur amount to which a first gain has been applied and high-frequency components of the second motion blur amount to which a second gain has been applied, and
the one or more processors further function as:
  a filter control unit configured to control a cutoff frequency of a low-pass filter that extracts the low-frequency components and a high-pass filter that extracts the high-frequency components in accordance with the relative reliabilities; and
  a gain control unit configured to control the first gain and the second gain in accordance with the relative reliabilities.

13. A capture apparatus, comprising:
a control apparatus; and
one or more processors that execute a program stored in a memory and thereby function as a blur correction control unit configured to execute optical or electronic blur correction with use of a motion blur correction amount,
wherein the control apparatus obtains a correction amount for correcting a motion blur attributed to a motion of an object, the control apparatus comprising:
one or more processors that execute a program stored in a memory and thereby function as:
  a first computation unit configured to compute a first motion blur amount based on a position of an object region in a captured image;
  a second computation unit configured to compute a second motion blur amount based on an object vector indicating a motion of an object between captured images; and
  a correction amount computation unit configured to obtain the motion blur correction amount by adding the first motion blur amount and the second motion blur amount with use of weights corresponding to relative reliabilities of the first motion blur amount and the second motion blur amount.

14. The capture apparatus according to claim 13, wherein
the one or more processors of the image capture apparatus further function as:
  a camera shake correction amount computation unit configured to compute a camera shake correction amount based on a motion of the capture apparatus; and
  a combining unit configured to obtain a blur correction amount by combining the motion blur correction amount and the camera shake correction amount, and
the blur correction control unit executes the optical or electronic blur correction with use of the blur correction amount.

15. A control method for obtaining a correction amount for correcting a motion blur attributed to a motion of an object, the control method being executed by a control apparatus and comprising:
  computing a first motion blur amount based on a position of an object region in a captured image;
  computing a second motion blur amount based on an object vector indicating a motion of an object between captured images; and
  obtaining a motion blur correction amount by adding the first motion blur amount and the second motion blur amount with use of weights corresponding to relative reliabilities of the first motion blur amount and the second motion blur amount.

16. The control method according to claim 15, further comprising
  determining the relative reliabilities based on one or more items selected from among a detection reliability of the object region, a reliability of the object vector, and a type of the object.

17. The control method according to claim 15, further comprising:
  obtaining the motion blur correction amount by adding the first motion blur amount to which a first gain has been applied and the second motion blur amount to which a second gain has been applied, and
  controlling the first gain and the second gain in accordance with the relative reliabilities.

18. A non-transitory computer-readable medium storing a computer program having instructions executable by a computer that, when executed by a computer, causes the computer to perform a control method for obtaining a correction amount for correcting a motion blur attributed to a motion of an object, the method comprising:
- computing a first motion blur amount based on a position of an object region in a captured image;
- computing a second motion blur amount based on an object vector indicating a motion of an object between captured images; and
- obtaining a motion blur correction amount by adding the first motion blur amount and the second motion blur amount with use of weights corresponding to relative reliabilities of the first motion blur amount and the second motion blur amount.

19. The non-transitory computer-readable medium according to claim 18, further comprising
- determining the relative reliabilities based on one or more items selected from among a detection reliability of the object region, a reliability of the object vector, and a type of the object.

20. The non-transitory computer-readable medium according to claim 18, further comprising:
- obtaining the motion blur correction amount by adding the first motion blur amount to which a first gain has been applied and the second motion blur amount to which a second gain has been applied, and
- controlling the first gain and the second gain in accordance with the relative reliabilities.

* * * * *